United States Patent [19]
Brook et al.

[11] Patent Number: 5,621,563
[45] Date of Patent: Apr. 15, 1997

[54] METHOD AND APPARATUS FOR POSITIONING A FOCUSING LENS

[75] Inventors: Mark G. Brook, Londonderry, N.H.; Mark E. Tellam, Charlestown, Mass.

[73] Assignee: AGFA Division, Bayer Corporation, Wilmington, Mass.

[21] Appl. No.: 605,484

[22] Filed: Feb. 26, 1996

Related U.S. Application Data

[63] Continuation of Ser. No. 496,713, Jun. 29, 1995, Pat. No. 5,532,846.
[51] Int. Cl.$^6$ ................................................. G02B 26/08
[52] U.S. Cl. ........................... 359/210; 358/494; 358/497
[58] Field of Search ................................ 359/196–215, 359/223, 225, 226; 250/234–236, 208.1; 358/474, 482–483, 487, 494, 497; 355/233, 235, 55–56

[56] References Cited

U.S. PATENT DOCUMENTS

| | | | |
|---|---|---|---|
| 3,752,558 | 8/1973 | Lloyd | 359/198 |
| 5,532,846 | 7/1996 | Brook et al. | 358/497 |
| 5,535,040 | 7/1996 | Ohtsuka | 359/210 |

*Primary Examiner*—James Phan
*Attorney, Agent, or Firm*—John A. Merecki

[57] ABSTRACT

A scanning apparatus providing separate fixed focal planes for transmissive and reflective original documents to be scanned, wherein a scan carriage containing illumination, sensor, and optical elements is moved together to scan an original document and to obtain a digitized representation thereof. The movable scan carriage has an illumination source disposed between the reflective and transmissive object focal planes, with the object focal plane to be used selected by changing the position of one or more optical elements within the scan carriage. The resolution of the digitized representation of the scanned original document can be determined by rotation of at least one lens about an axis substantially perpendicular to its optic axis.

6 Claims, 22 Drawing Sheets

METHOD AND APPARATUS FOR POSITIONING A FOCUSING LENS

This application is a Continuation of application Ser. No. 08/496,713 filed on Jun. 29, 1995, entitled METHOD AND APPARATUS FOR POSITIONING A FOCUSING LENS, now U.S. Pat. No. 5,532,846.

CROSS REFERENCE TO RELATED APPLICATIONS

The present application is related to the following commonly assigned co-pending application: U.S. Ser. No. 427,477 entitled "LINEAR DRIVE SYSTEM USING HELICALLY-WOUND BANDS", and to the applications of Kevin J. Haded, Mark G. Brook, Mark E. Tellam, John Omvik and Joseph A. Wheeler for "SCANNING SYSTEM FOR SCANNING REFLECTIVE AND TRANSMISSIVE IMAGES ", John Depiano for "OPTICAL PATH FOR A SCANNING SYSTEM", Marc Cresens, John Omvik, Mark G. Brook, Kevin J. Haded, and Mark E. Tellam for "ILLUMINATION SYSTEM FOR A FLAT-BED SCANNING SYSTEM", John Omvik, Joseph A. Wheeler, Mark G. Brook, Kevin J. Haded, Mark E. Tellam and Patrick Pandelaers For "COMBINED DUST PROTECTION AND DARK CALIBRATION SLIDE FOR A FLAT-BED SCANNER", Mark E. Tellam, Mark G. Brook, Kevin J. Haded and Joseph A. Wheeler for "SCANNER DRIVE SYSTEM HAVING MINIMUM ROTATIONAL ERROR CARRIAGE SUSPENSION", Christopher Duval for "SCANNER ENCODER SYSTEM", and Joseph A. Wheeler, John Omvik, Christopher Duval, Mark E. Tellam, Mark G. Brook and David LeClerc for "APPARATUS FOR ALIGNMENT OF MATERIAL TO BE SCANNED IN A FLAT-BED SCANNER", filed simultaneously) herewith and assigned to the same assignee.

BACKGROUND

The field of the present invention is optical scanning of high-resolution color images, and in particular, the use of a flat-bed scanner system for the scanning of reflective and transmissive original documents at high resolution in a high volume production environment typical in the graphic arts electronic prepress industry. The original documents scanned by such systems include color or monochrome photographs, artwork, and composed pages of text and graphics. The actual graphic image content of the scanned original document is referred to as an "original".

In use of a flat-bed scanner for reflective scanning, an original on an opaque substrate is placed with the surface containing the original facing down on a flat transparent reference surface, typically glass. The original document is fixed on the surface such that a single line of the original, herein after referred to as a "scan line" is illuminated from below, and the light reflected from the scan line is directed through an optical system to form an image of the scan line on a sensor such as a CCD array, which converts the optical signal to an electronic representation of the scan line, comprising a line of digital picture elements, or "pixels". The desired portion of the original is scanned, one scan line at a time, by moving the original relative to the illumination system, optical system, and sensor along a direction hereinafter referred to as the "scanning axis". In systems typical of the prior art, such as that disclosed in U.S. Pat. No. 5,341,225, the illumination system, optical system and sensor are configured to move together as a unit. In other systems, such as those of U.S. Pat. No. 5,140,443, the original is moved while the illumination system, optical system and sensor remain fixed. In a production environment, original documents are scanned in a sequence, with each requiring a preparation step in which the original to be scanned is located and fixed on the surface in proper alignment and registration, followed by the actual scanning operation.

A transparent original document, typically a photographic transparency, comprises an original on one side of a thin transparent substrate. In this case, the original is illuminated from the side opposite from that containing the optical system and sensor. Use of a single flat-bed scanner for both types of scanning involves a modal configuration change. Typically, a flipcover used in reflective scanning mode to hold the original document flat on the transparent surface is replaced by a transmissive illumination module which illuminates from above the portion of the original to be scanned. As in reflective-mode scanning, prior art systems are configured so that either the original or one or more scanner illumination, optics or sensor components move to carry out the scanning process.

In addition to reconfiguration of the illumination system, the magnification of the optical system is typically changed so that the same number of pixels imaged on the CCD array, and captured by the digitizing electronics, corresponds to a larger or smaller area of the original. In high-resolution scanning systems typically in use in graphic arts electronic prepress processing, transparencies are oftentimes scanned at resolutions of 4,000 pixels per inch (ppi) or greater, while reflective originals are usually scanned at much lower resolutions, for example 1,200 ppi. Accordingly, in a production environment in which both reflective and transmissive originals are to be scanned in a mixed processing sequence, mode changes involving illumination system and resolution settings can add significantly to the time required for job processing.

It is therefore a general object of the present invention to provide an apparatus for high-volume, high-resolution color scanning for both reflective and transmissive original documents.

It is a specific object of the invention to provide a scanning apparatus wherein reflective and transmissive original documents can be intermixed in processing order with minimum system reconfiguration.

It is a further specific object of the invention to minimize the time during which the scanning apparatus must await original document preparation and setup for the next scan.

It is a feature of the invention that transmissive original documents can be prepared for a next scanning operation without interrupting a scanning operation currently in process.

It is another feature of the invention that positioning a transmissive original document in the scanning apparatus automatically, selects operational parameters for transmissive scanning, and its removal restores the operational parameters for reflective scanning.

It is still another feature of the invention to provide visual aids for the accurate positioning and alignment of a reflective original to be scanned to minimize the time required for original document setup in reflective mode.

SUMMARY OF THE INVENTION

The apparatus comprises a flat-bed scanner providing separate fixed object focal planes for transmissive and reflective originals, wherein a movable module, hereinafter referred to as a "scan carriage", containing illumination, sensor, and optical elements is moved to scan an original. The movable scan carriage has an illumination source disposed between the two object focal planes, with the object focal plane to be used (transmissive or reflective) selected by changing the position of one or more optical elements within the scan carriage. The magnification of the optical system, i.e., the resolution of the digital representation of the original, can be adjusted independently of the selection of an object focal plane.

The positioning of optical elements to select the object focal plane is the subject of several embodiments to be described in detail below. One or more mirrors can be moved so as to retain the total optical path length between the selected object focal plane and the sensor focal plane, i.e., the plane on which the original is imaged on the sensor. Resolution selection can occur through linear motion of a focusing lens or an element of a focusing lens, singly or in combination with the motion of one or more mirrors. In one embodiment, resolution selection is accomplished by rotating a focusing lens about an axis perpendicular to its optic axis.

The illumination system can be configured according to the object focal plane selected, using one or more elongated lamps disposed along axes substantially parallel to the scan line axis of an original at the selected object focal plane. In one embodiment, three tubular lamps are fixed in a removable lamp cartridge disposed in the movable scan carriage such that two of the three lmps are used with the upper (reflective) object focal plane, and the third for the lower (transmissive) object focal plane. In alternate embodiments, one or two lamps serve both reflective and transmissive modes with additional optical components used to direct light to the selected object focal plane.

The transmissive object focal plane is fixed with respect to the scanning apparatus, located between the illumination system and the other optical components. In one embodiment, a removable transparency holder is used for access to the transmissive object focal plane, and for accurate placement of an original document to be scanned before insertion into the scanner. In alternate embodiments, the action of insertion or removal of the transparency holder is used, through appropriate linkages with illumination system elements and/or optical elements, to select the transmissive or reflective focal planes respectively.

As a protection against dust and optical flare, the scan cartridge is effectively sealed, with only an essential linear aperture open during the scanning operation. In one embodiment, a dark slide is disposed such as to close this linear aperture when scanning is not taking place and when the system is being used for dark current calibration. In another embodiment, a plurality of dark slides are combined to produce an aperture shutter for maximum flare reduction in addition to dust protection.

The scan carriage is moved along a scanning axis from one end of the original to be scanned to the other, carrying the illumination, optics and sensor systems within it. Several drive system embodiments are described suitable for use in the apparatus of the invention. One embodiment employs a plurality of helically-wound bands disposed end-to-end as means for assuring a precise movement and position encoding. In an alternate embodiment, a motor drive system is used wherein the scan line axis of a scanned original passes through a center of rotation of the scanning module. Configurations using a stepper motor and D.C. motor with position encoder can be used for the drive system.

Finally, the movable scan carriage can include alignment aids visible at the reflective scanning surface, such that a user can accurately position an original to be scanned with respect to the scan line axis.

The use of separate object focal planes for reflective and transmissive scan modes provides the benefit over the prior art in not having to carry out mode change operations such as installation of a separate illumination unit for transmissive scan mode. Although use of two object focal planes is in itself not new in the art, the use of a single illumination system together with mode-selection linkages and other features, fixed within a self-contained moving scan carriage, is unknown in the art. Accordingly, the objects of the invention are met by the ability to change modes quickly, without extensive reconfiguration of components of the scanning apparatus. Transparencies can be prepared outside of the scanner while a current reflective or transmissive scan is in progress, and a transparency can be scanned without disturbing the reflective scanning surface. Additional efficiency and digital image quality are obtained from the fact that transparencies need not be mounted on a glass surface, or in a glass sandwich. The combined effect of these improvements over prior art scanning systems is enhanced productivity in an apparatus used for high-volume, high-resolution color scanning for reflective and transmissive originals intermixed in processing order.

BRIEF DESCRIPTION OF THE DRAWINGS

The objects and features of the present invention will best be understood from a detailed description of a preferred embodiment thereof selected for the purposes of illustration and shown in the accompanying drawings, in which.

DETAILED DESCRIPTION OF INVENTION

Figure 1A:
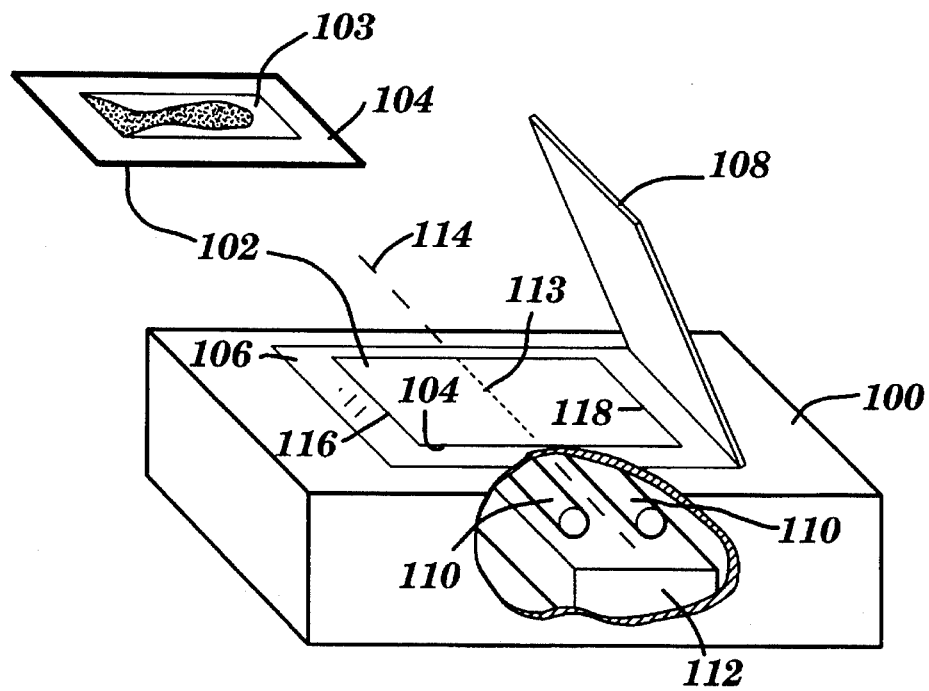
FIG. 1A and FIG. 1B show perspective views of a single object focal plane dual-mode flat-bed scanner, configured according to the prior art for reflective and transmissive original scanning, respectively.
Figure 1B:
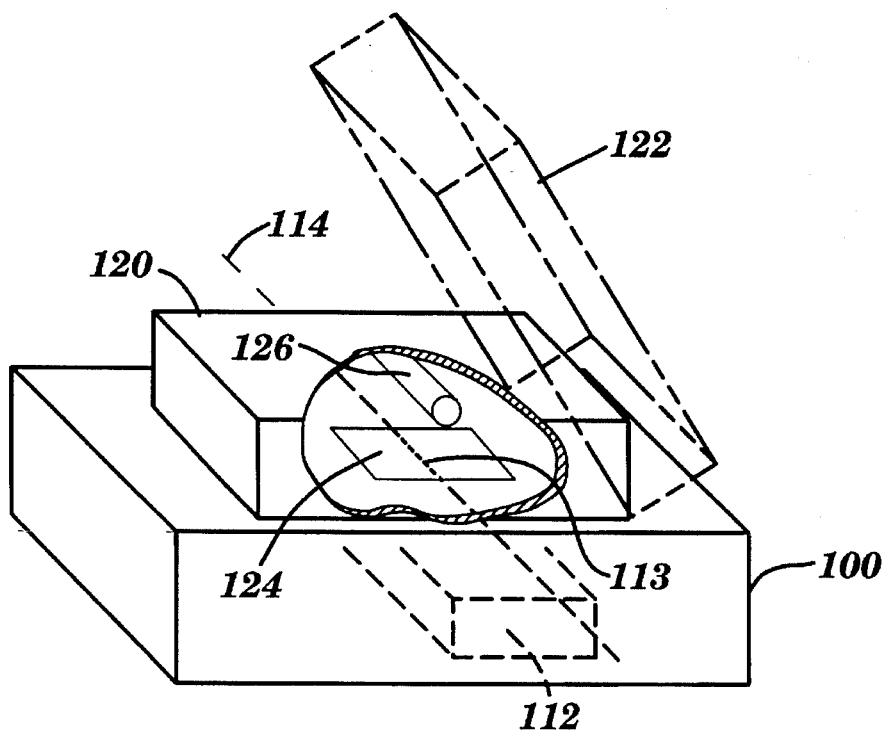

Turning now to the drawings, the various embodiments of the invention will be described with respect to the optical system, illumination system, linear drive system, and other components, wherein like reference numerals refer to like elements throughout the drawings. FIG. 1A and FIG. 1B show perspective views of a dual mode flat-bed scanner according to the prior art. In FIG. 1A, a scanner 100 is configured for the reflective scanning mode. An original document 102 is placed with the surface 104 containing the original 103 to be scanned facing down on a transparent surface 106, and held in place by a flipcover 108. The surface is illuminated from below by lamps 110, producing a scan line 113 having a scan line axis 114, wherein the lamps 110 are disposed substantially parallel to the scan line axis 114. The scanning optics and sensor electronics are located in scan module 112, which is driven together with lamps 110 such as to move the scan line 113 from one end 116 of the original document 102 to the other end 118 of original document 102.

In FIG. 1B, the same scanner 100 is re-configured for the transmissive scanning mode. Flipcover 108 is replaced by a transmissive illumination module 120 which can be raised to position 122 for insertion or removal of a transparent original document 124 to be scanned. An illumination system, shown in the drawing as lamp 126, is disposed so as to illuminate scan line 113 of the transparent original document 124 from above along scan line axis 114, thereby allowing scanning of the illuminated transparent original document 124 by the scan module 112.

Figure 2A:
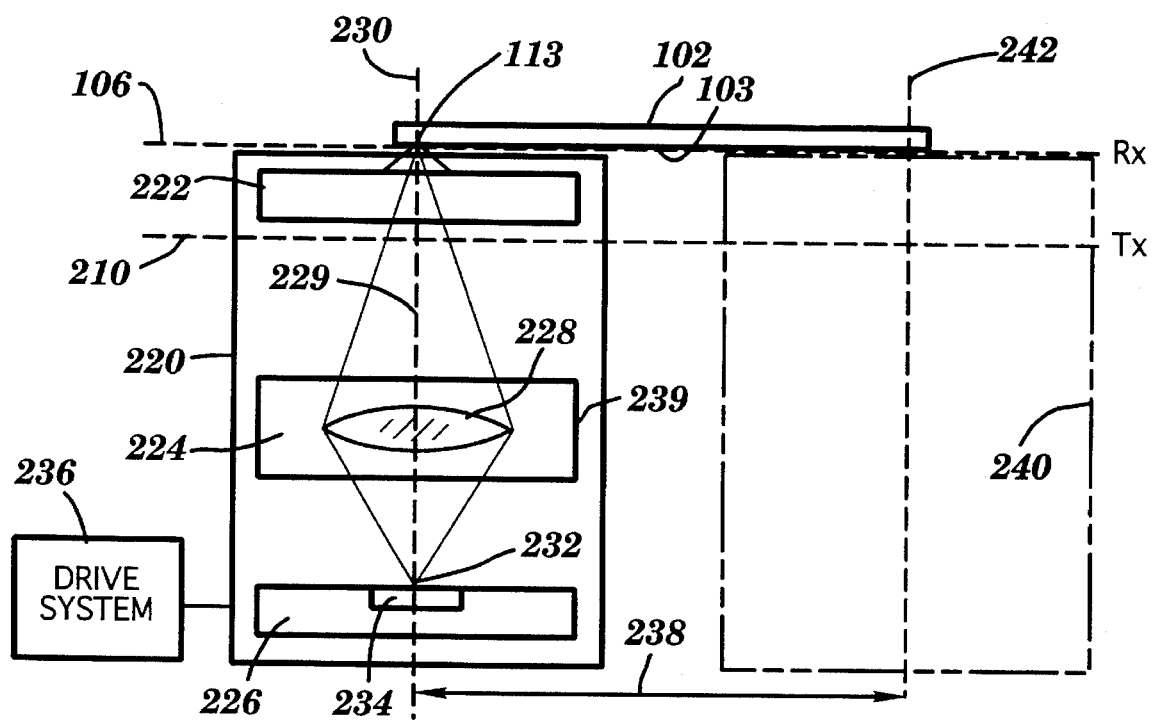
FIG. 2A and FIG. 2B show in block diagram form a dual object focal plane scanning apparatus according to the present invention, providing reflective and transmissive scanning modes, respectively.
Figure 2B:
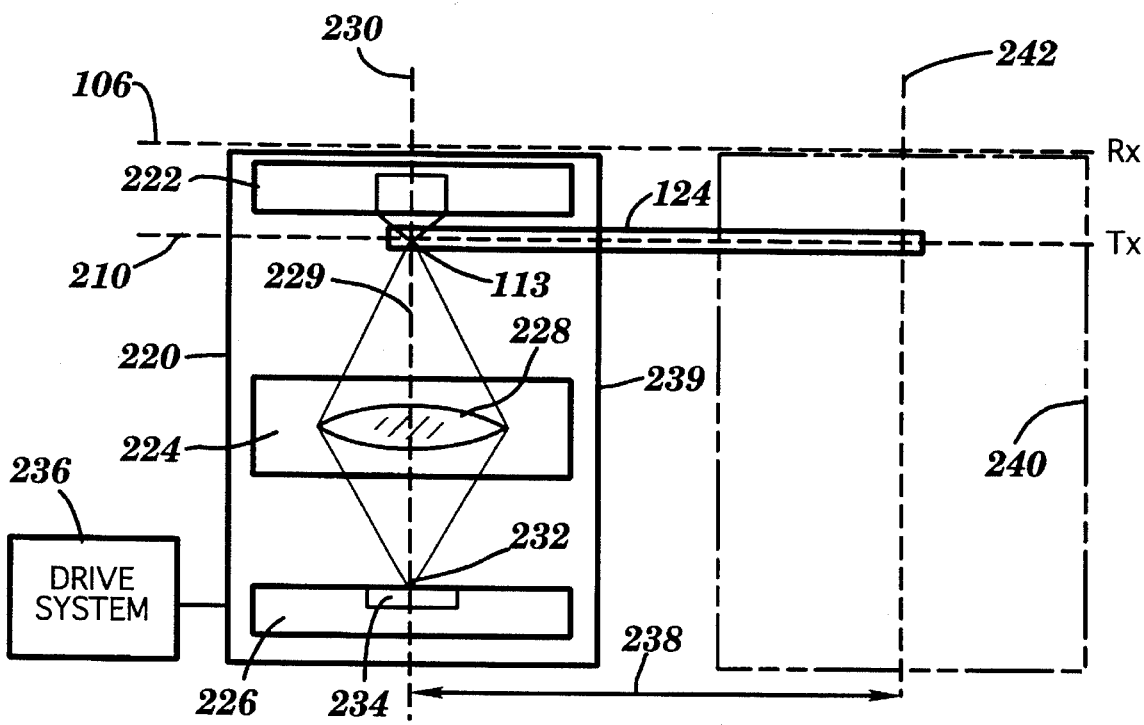

FIG. 2A and FIG. 2B show block diagram views of a dual mode flat-bed scanning apparatus according to the invention. In FIG. 2A, a reflective original document 102 is placed with the original 103 to be scanned on the surface 106, hereinafter referred to as the "Rx object focal plane". A second object focal plane 210 is located below the Rx object focal plane 106 and hereinafter referred to as the "Tx object focal plane", to be described further below. The scan carriage 220 comprises illumination system 222, optical system 224 and sensing system 226. The illumination system 222 includes one or more lamps and other components (not shown), disposed so as to illuminate the original 103 along scan line 113. Of course, as should be readily apparent, scan line 113 extends perpendicularly out of the page along scan axis 114 (not shown).

The optical system 224 includes one or more focusing elements, (assumed in this discussion to be a focusing lens 228) possibly combined with other optical components to determine an optical path 229, having optic axis 230, from scan line 113 to sensor focal plane 232. The sensing system 226 comprises a linear sensor array 234 together with electronics used for data acquisition and control (not shown). For the purposes of this discussion, it is assumed that the array 234 is a linear CCD array, but alternate sensor systems can be used as well.

A linear drive system 236 is used to move the scan carriage 220 and the components fixed within it along a scanning axis 238 from its starting position 239 to end of scan position 240, with optic axis 230 moved to position 242, thereby scanning the original 103, which remains fixed in a stationary position on the Rx object focal plane 106.

In FIG. 2B, the apparatus of FIG. 2A has been reconfigured for transparency scanning mode. A transparent original document 124 is placed with its emulsion surface in the Tx object focal plane 210. Illumination system 222 illuminates the scan line 113 in Tx object focal plane 210, and optical system 224 is changed such as to focus the scan line 113 at sensor focal plane 232. As in reflective scan mode, the original document 124 remains stationary as the scan carriage 220 is driven along scanning axis 238 by linear drive system 236 from beginning of scan to end of scan.

Optical System

The optical system of the scan carriage 220 provides three functions: (1) selection of the object focal plane as described above; (2) determination of the magnification of the object projected upon the sensor focal plane 232; and, (3) folding of the optical path 229 for efficient use of the physical volume within the scan carriage 220. These functions will be considered in the discussion and drawings to follow.

Figure 3A:
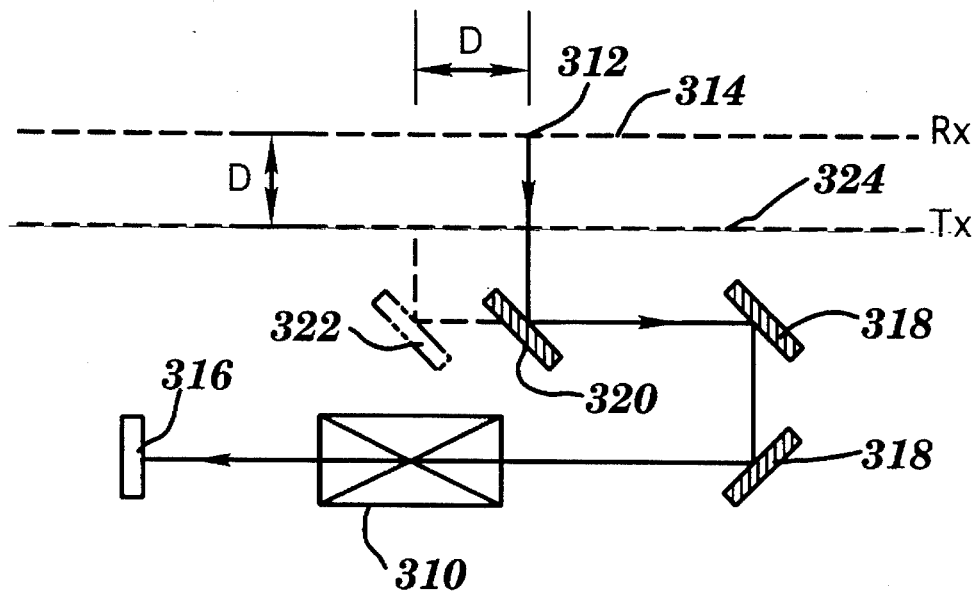
FIG. 3A and FIG. 3B illustrate the selection of object focal planes by motion of a single mirror in the moving scan carriage.
Figure 3B:
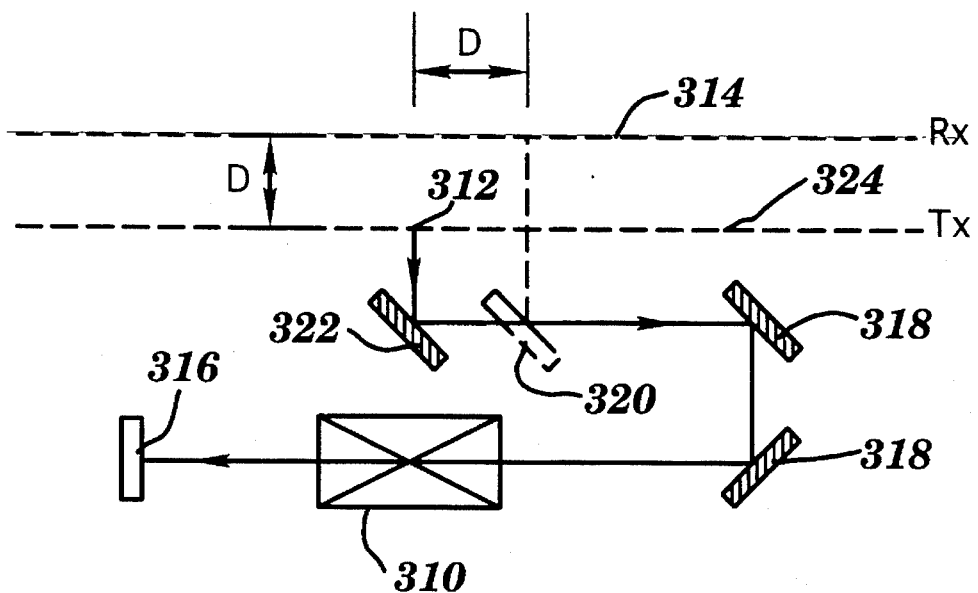

FIG. 3A and FIG. 3B illustrate the use of a single mirror for selection between the Rx and Tx object focal planes for reflective and transmissive originals, respectively. In FIG. 3A, a lens 310 focuses a scan line 312 in the Rx object focal plane 314 on a sensor array 316 using two fixed mirrors 318 and one movable mirror 320 to fold the optical path accordingly. In FIG. 3B, the mirror 320 has been moved a linear distance D to position 322, where the distance D is the separation distance between the Rx object focal plane 314 and the Tx object focal plane 324. The total optical path length from scan line 312 to sensor focal plane 316 therefore remains constant.

Figure 4A:
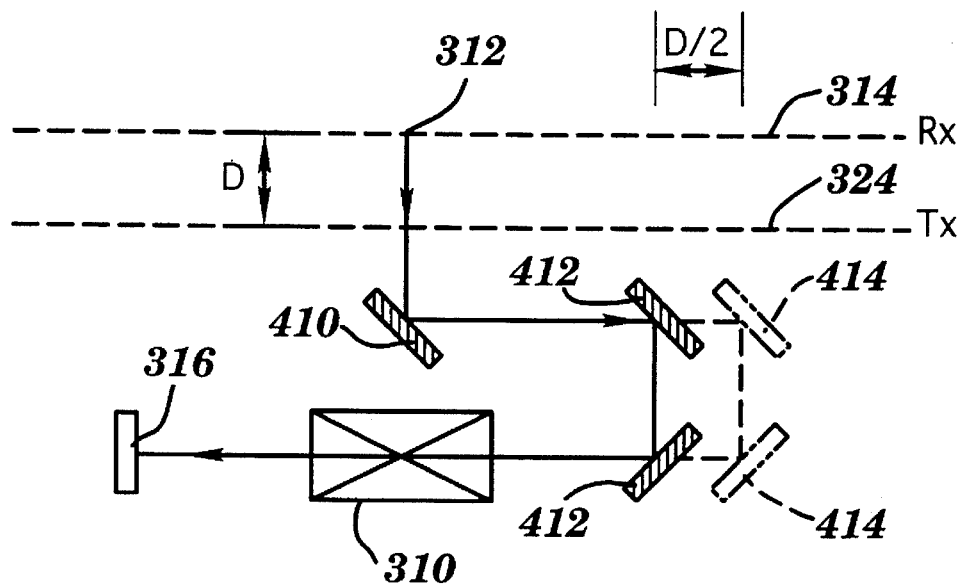
FIG. 4A and FIG. 4B illustrate the selection of object focal planes by motion of a mirror pair in the moving scan carriage.
Figure 4B:
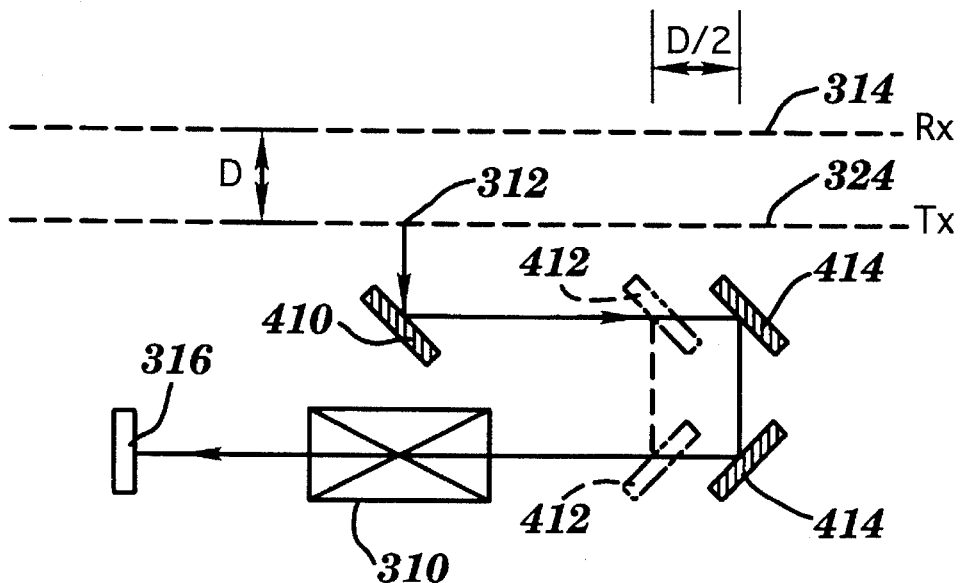

FIG. 4A and FIG. 4B illustrate the use of a movable pair of mirrors for selection between the Rx and Tx object focal planes. In FIG. 4A, fixed mirror 410 is used together with movable mirror pair 412 to select Rx object focal plane 314. In FIG. 4B, the movable mirror pair 412 has been moved a linear distance D/2 to position 414, where D is again the separation distance between Rx object focal plane 314 and Tx object focal plane 324.

In the configurations of FIG. 3A through FIG. 4B described above, a constant optical path between the selected object focal plane is folded substantially horizontally, using the vertically disposed fixed mirror pair 318 in FIG. 3A and vertically disposed movable mirror pair 412 in FIG. 4A. A consequence of these configurations is that the first mirror in each case (mirror 320 in FIG. 3A and mirror 410 in FIG. 4A) is close to the selected object focal plane, causing potential degradation of the digitized image as a result of dust settling on the mirror surface. This degradation is due to the fact that, for long focal length lenses typically used in scanning systems, dust particles close to the object focal plane can be partially focused at the sensor focal plane, and can therefore cause digitized image contamination for originals at the nearest object focal plane, i.e., at the Tx object focal plane 324. This can be seen from the fact that the peak-to-peak signal variation V along the sensor focal plane as a result of dust having a mean radius a on a surface located a distance d from the object focal plane is $$V = \frac{a^2}{d^2 \tan^2(\sin^{-1}(NA))} \times 100\% \qquad [1]$$

where NA is the working numerical aperture of the object space. As a rule of thumb, d should be great enough so that V≦~20% if uncorrectable degradation of the digitized image is to be avoided.

There exist variations on the configurations of FIG. 3A through FIG. 4B in which the first mirror is kept at maximum distance, for example by folding the beam over itself (interchanging the positions of mirror 320 and lens 310 in FIG. 3A). Such configurations usually require more physical volume, however, in order to avoid "collisions" between the optical components (e.g., between mirror 322 and lens 310 in FIG. 3B).

Figure 5A:
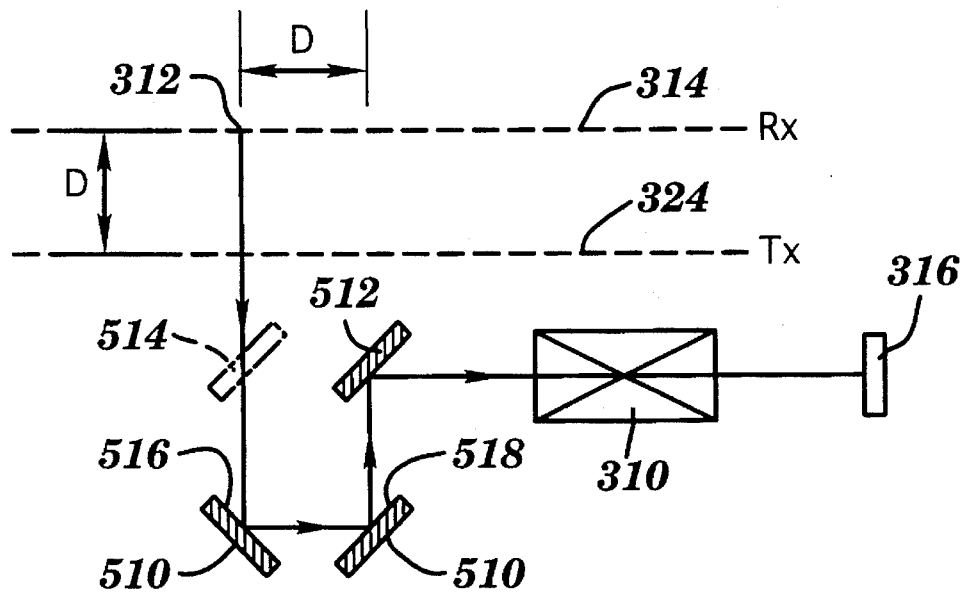
FIG. 5A and FIG. 5B show an alternate embodiment with a single movable mirror for object focal plane selection.
Figure 5B:
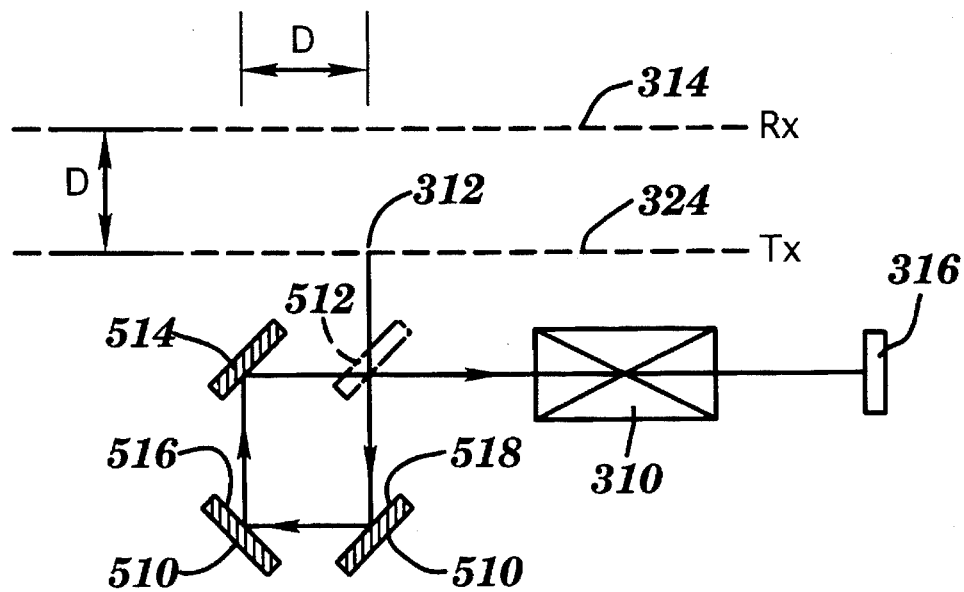

FIG. 5A and FIG. 5B show an embodiment wherein a single mirror is moved to select between alternate optical paths of the same total path length, using a fixed pair of mirrors disposed horizontally so as to fold the beam vertically. In FIG. 5A, the scan line 312 is focused by lens 310 on sensor array 316 using fixed mirror pair 510 and movable mirror 512. In FIG. 5B, the mirror 512 has been moved a linear distance D to position 514, where D is the separation distance between the Rx object focal plane 314 and the Tx object focal plane 324. In this case moving the mirror 512 has the effect of reversing the folding direction, and folding the beam back over itself.

This configuration has the immediate advantage that the first reflecting mirror in each case is one of the mirror pair 510, which can be placed far enough from the nearest object focal plane (the Tx object focal plane 324 in this case) to minimize variations due to dust as given by equation [1] and the components are readily configured to avoid "collisions" of the type described above. The fact that the two mirrors of the pair 510 have upward facing faces 516 and 518 makes them more susceptible to dust settling, but since according to equation [1] the dust is not focused at the sensor array 316, its presence has only the effect of uniformly diminishing the image intensity. Protection against dust by sealing the scan carriage (to be discussed further later in this specification) is a way of minimizing this effect.

The resolution of a digitized image obtained by scanning is determined by the number of resolution elements at the sensor plane and the magnification of the optical system. For the case of a linear CCD sensor array, the resolution r is determined by:

$$r = a\left(\frac{S_s}{S_o}\right) ppi \qquad [2]$$

where a is a measure of the CCD element density (e.g., elements per inch), $S_o$ and $S_s$ are the effective optical path distances of the object and sensor to the focusing lens, respectively). Accordingly, the resolutions available in a CCD scanner are determined by changing the optical path distances $S_o$ and $S_s$, by moving one or more elements of the optical system, as described and illustrated in the following figures.

Figure 6A:
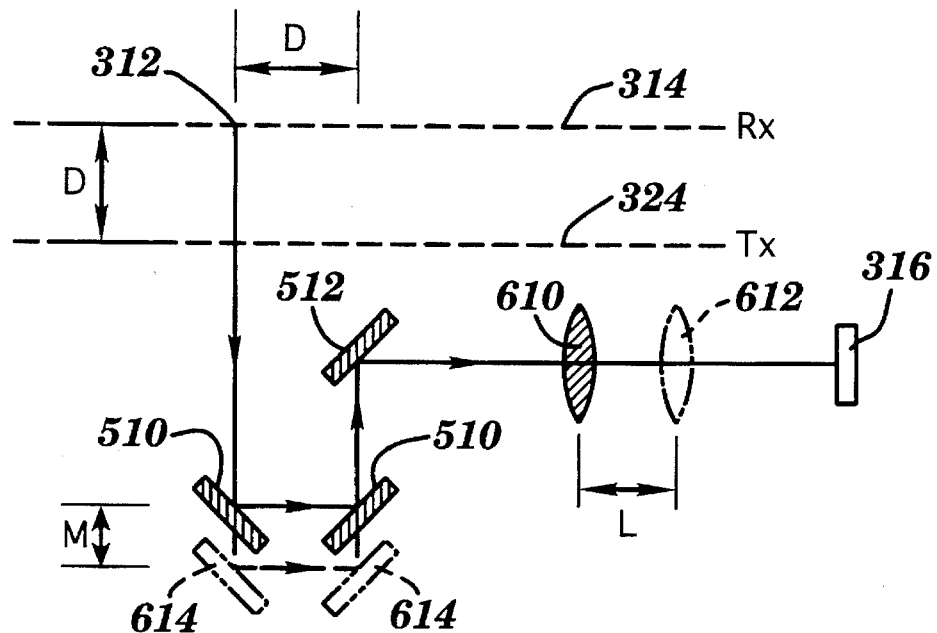
FIG. 6A illustrates resolution selection by linear motion of a fixed focal-length lens.

FIG. 6A illustrates resolution selection by moving a fixed focal length lens, using the optical configuration of FIG. 5A as a reference. In the drawing, lens 610 having fixed focal length F is moved a distance L to position 612. The condition for the object at scan line 312 for the Rx object focal plane 314 to be focused at sensor plane 316 is given by the following well-known equation:

$$1/S_o = 1/F - 1/S_s \qquad [3]$$

As a result, one or more elements of the optical system have to move in addition to the lens 610 to satisfy the condition. In the drawing, the sensor plane 316 is fixed and mirror pair 510 is moved a distance M to position 614, thereby adjusting the distance $S_o$ as required. In an alternative arrangement, the position of the sensor array 316 can be moved instead of or in addition to the mirror pair 510.

Figure 6B:
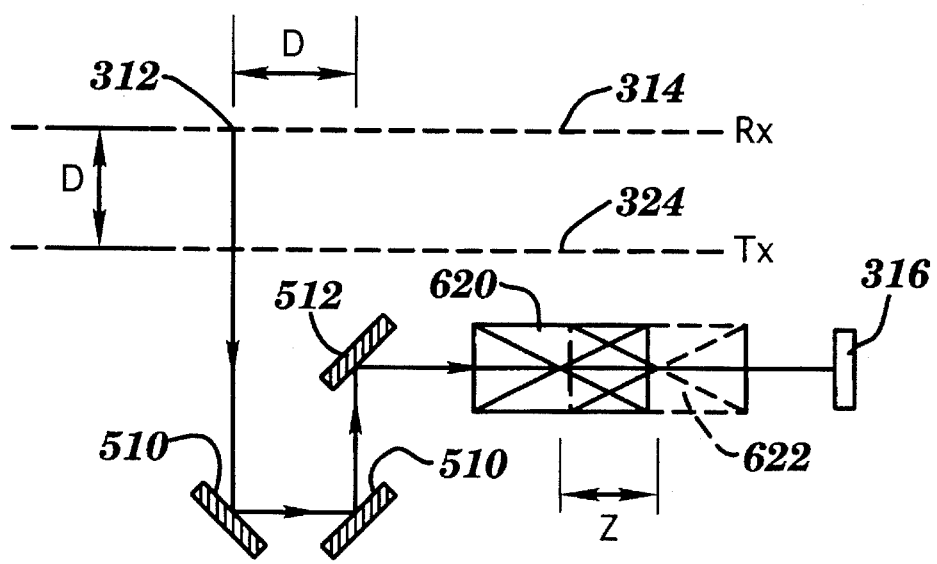
FIG. 6B illustrates resolution selection by changing the focal length of a zoom lens.

In FIG. 6B, a compound lens with variable focal length is used as the focusing lens. In this case, moving the lens 620 a distance Z to position 622 while at the same time changing its focal length can select a new magnification while ensuring satisfaction of equation [3].

Although image resolutions can be continuously variable over a range of values, they are usually, selected from a fixed set specified for the scanner system, using mechanical linkages which permit continuous movement of the focusing lens or its elements and other optical elements as necessary to satisfy equation [3] at all times. The following discussion is directed to means for changing the position of a focusing lens in discrete steps corresponding to selected resolutions.

Figure 7A:
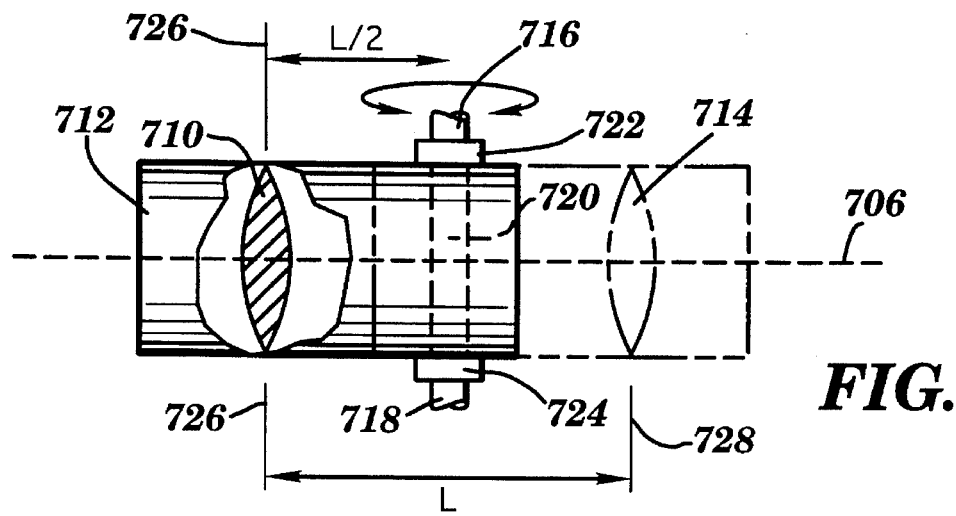
FIG. 7A and FIG. 7B illustrate resolution selection by rotating a lens about an axis perpendicular to its optic axis.
Figure 7B:
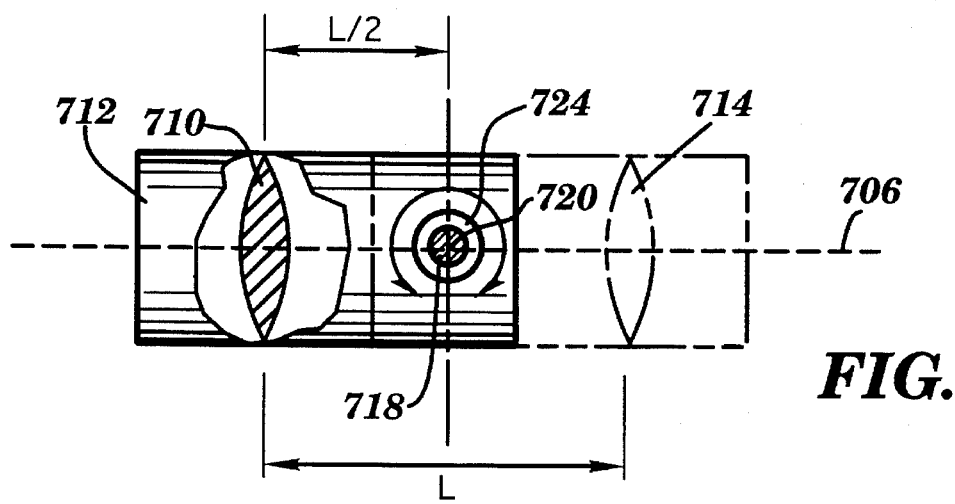

FIG. 7A and FIG. 7B illustrate an alternative to direct linear motion of a lens for positioning, wherein a lens is rotated about an axis substantially perpendicular to its optic axis. A lens 710 having an optic axis 706 is mounted in an assembly 712 configured for rotation through an angle substantially equal to 180° thereby moving lens 710 to a new position 714. Shafts 716 and 718 coaxial with axis of rotation 720 are constrained by bearings 722 and 724. The effective center 726 of lens 710 is offset from axis of rotation 720 by a distance L/2, where L is the distance between the original lens position 726 and the new lens position 728.

Figure 7C:
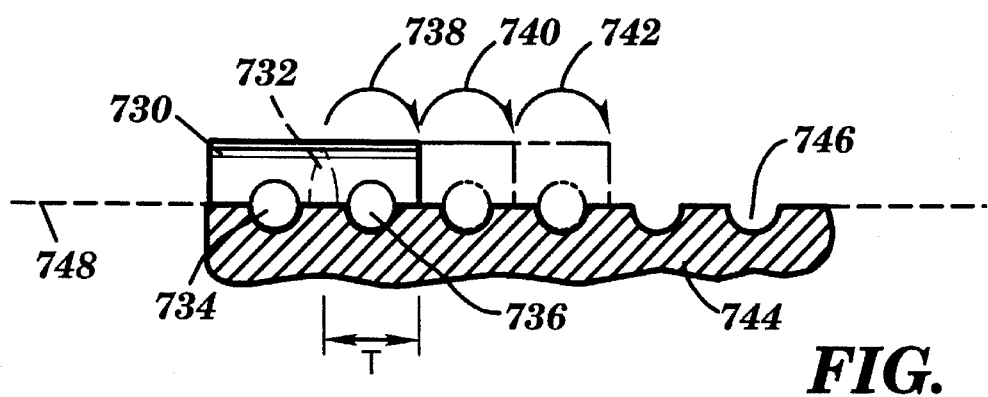
FIG. 7C illustrates resolution selection by multiple rotations of a lens about an axis perpendicular to its optic axis.

FIG. 7C illustrates a variation of the above configuration, in which a lens assembly 730 contains a lens 732 with side shafts 734 and 736 arranged such that a succession of "tumbling" operations (738,740 and 742 for example) bring the lens 732 into a new registered position along a guide 744 having indentations 746 to receive and position side shafts 734 and 736. Each such "tumble" of the assembly moves the lens center a distance T along guide 744 in a direction substantially parallel to the optic axis 748 of lens 732.

From the previous discussions it is clear that in the apparatus of the invention the selection of object focal plane can be accomplished independently of resolution selection. In most cases, however, a different set of resolutions are selected for transparencies than for reflective original documents. Accordingly, switching from reflective to transmissive mode typically combines object focal plane and resolution selection operations. Returning to one mode after having selected the other restores the operational parameters, including resolution, applicable to that mode, thereby allowing intermixing of transparencies with reflective original documents in a processing sequence with a minimum of reconfiguration operations, in accordance with the objectives of the invention.

Since illumination, optical imaging, and sensing systems are all contained in the movable scan carriage, it is desirable to arrange these components to use the physical volume as efficiently as possible in order to avoid excessive size and mass of the movable carriage. It is well known in the art that folding the beam is one means for reducing the volume occupied by the optical path. Traditional scanning systems fold the beam in a single plane, as is illustrated in the configurations of FIG. 3A through FIG. 6B. As has been indicated, one of the limitations imposed upon beam folding configurations is "collisions" of components when they are moved for object focal plane and/or resolution selection.

Figure 8:
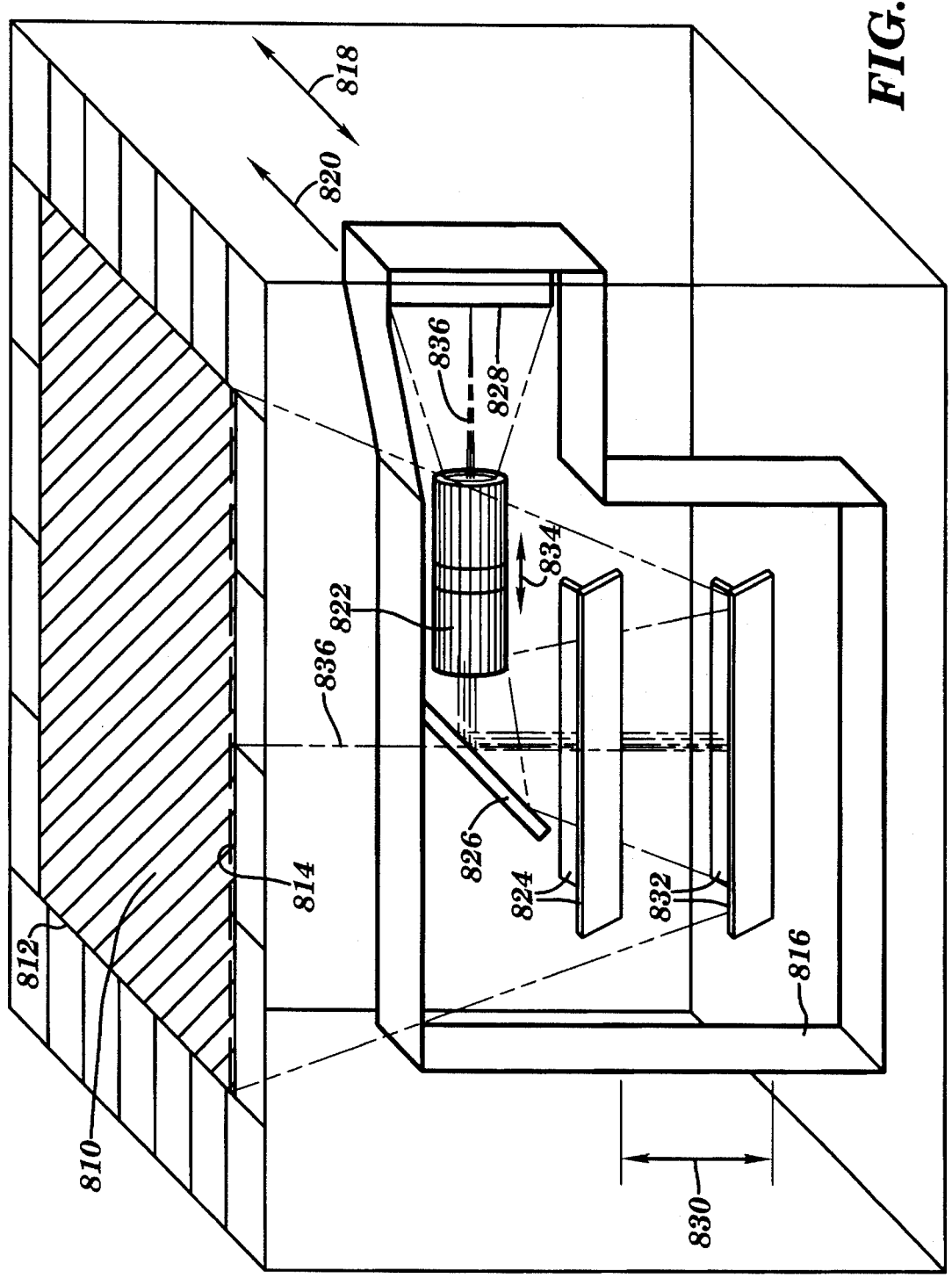
FIG. 8 shows an embodiment comprising an optical path folded in three dimensions.

One solution to the volume-efficiency problem lies in folding the beam in three dimensions, as illustrated in FIG. 8, which is a perspective view of an optics and sensor sub-assembly for an embodiment of the invention. An original 810 in object focal plane 812 is scanned one scan line 814 at a time by moving a scan carriage (not shown) containing sub-assembly 816 along scanning axis 818 in direction 820. Focusing lens 822 is used with a movable mirror pair 824 and a fixed mirror 826 to image scan line 814 on CCD array 828 mounted perpendicular to and in a plane substantially parallel to scanning axis 818. Mirror pair 824 can be moved through focal adjustment range 830 (to the lowest position at 832) to select the object focal plane and to compensate for movements 834 of lens 822 for resolution adjustments. The use of the fixed mirror 826 to fold the optical path 836 in a third dimension has the effect of shortening the dimension of the scan carriage sub-assembly 816 in the direction parallel to the scanning axis 818 at the expense of additional width in the direction parallel to the axis of lens 822. The ranges of movements 830 and 834, for movement of the mirror pair 824 and lens 822 respectively, are determined by the physical dimensions of the enclosure, the optical path and lens parameters, and position of mirror 826.

Illumination System

The various embodiments of illumination system 222 of FIG. 2A are described in the discussion and drawings to follow. One or more tubular lamps of the fluorescent type (warm cathode or cold cathode) are disposed parallel to the scan line so as to illuminate it at the object focal plane determined by the scanning mode (reflective or transmissive) in use. The line of illumination incident at the scan line at the object focal plane is referred to herein as the "illumination axis". In typical scanner illumination configurations, a pair of lamps are disposed so as to provide simultaneous illumination from both sides of a reflective mode illumination axis and directed upward to the scan line. For transmissive originals, only a single lamp is generally required, providing illumination of an object point from above the object focal plane and substantially coincident with a transmissive mode illumination axis. Since the transparent substrate of a transmissive original document is subject to surface scratches which can be imaged at the sensor plane if illuminated by a directed beam of light, means such as reflectors and/or diffusers are used to provide illumination within an acute angle from the illumination axis so as to minimize this effect.

Figure 9A:
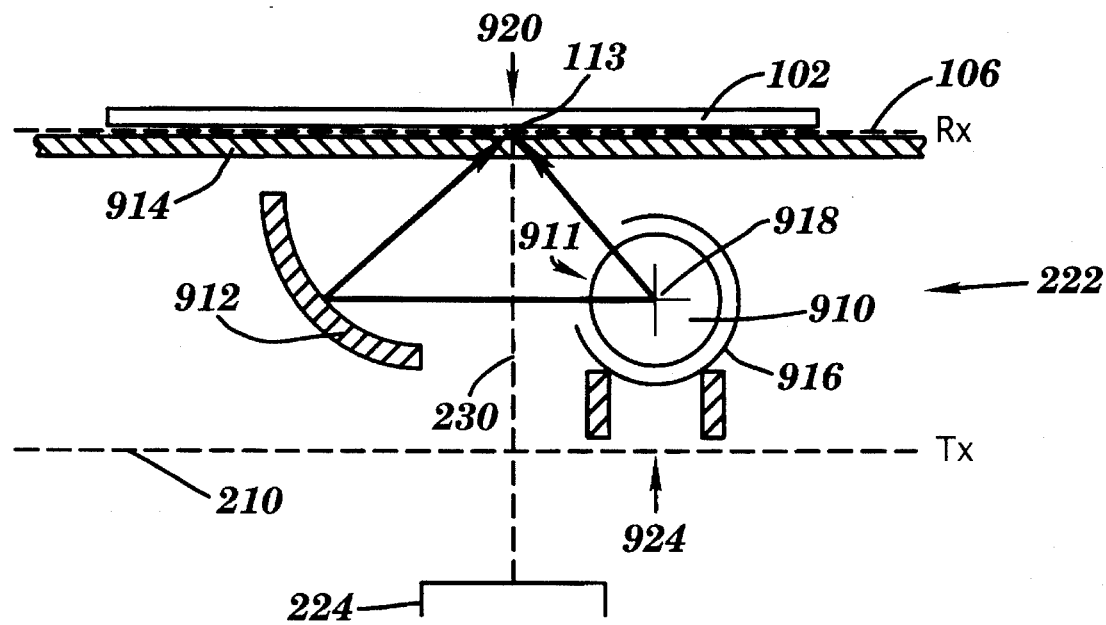
FIG. 9A and FIG. 9B show a dual-mode scanner illumination configuration with a single lamp according to the invention.

Configurations of one, two and three lamps are illustrated in the drawings of FIG. 9A through FIG. 13B. FIG. 9A and FIG. 9B show examples of illumination using a single lamp for reflective and transmissive scanning modes respectively. In FIG. 9A, a single lamp 910 provides direct side illumination of scan line 113 (perpendicular to page) and indirect side illumination through a fixed focusing mirror 912. The Rx object focal plane 106 is the top surface of a transparent layer 914 (e.g. glass), holding the reflective original document 102 being scanned. A reflective lamp collar 916 is rotatably disposed about the axis 918 of lamp 910 such as to direct the illumination through an elongated opening 911 containing the direct and indirect illumination paths. The scan line axis 114 (not shown) of scan line 113 is substantially coincident with the illumination axis 920 (perpendicular to page) for the reflective scanning mode.

Figure 9B:
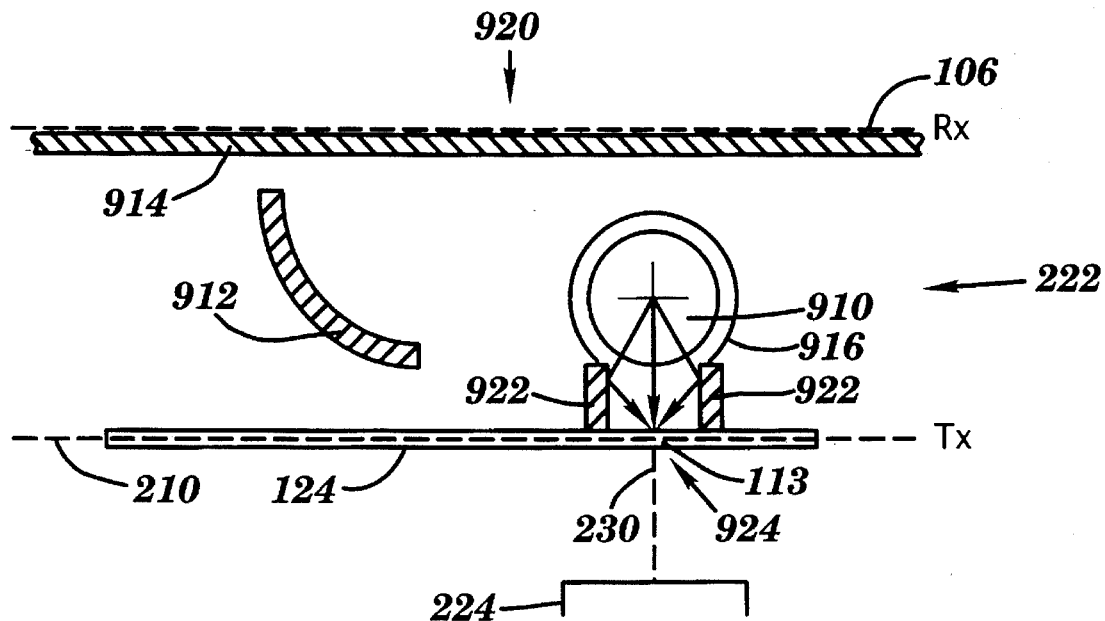

In FIG. 9B, reflective collar 916 has been rotated about axis 918 so as to illuminate a transparency 124 held at the Tx object focal plane 210 along a scan line 113 substantially perpendicular to optic axis 230. A pair of reflectors 922 reflects the illumination from lamp 910 so as to provide for scratch suppression as described above. In this example, changing modes is accomplished by rotating reflective collar 916 to shift the reflective mode illumination axis 920 to the transmissive mode illumination axis 924 (perpendicular to page), together with motion of the illumination system 222 relative to the optical system 224 such as to shift the scan line 113 accordingly.

In the example of FIG. 9A and FIG. 9B, as well as others to follow, a rotating reflective collar 916 has been used to redirect the light for illumination mode change. Other embodiments can be used to achieve similar results. For example, an alternative to rotating reflective collar 916 rotating about fixed (clear) lamp 910 is a rotatably-disposed lamp having an elongated aperture parallel to lamp axis 918, and having a (light-sealed) reflecting interior surface everywhere else. A second alternative comprises the use of a fixed lamp having two elongated apertures parallel to lamp axis 918 together with a rotating reflective collar 916 which selects the aperture appropriate for the illumination mode. Although the reflective collar is shown for the sake of simplicity in the following examples, it will be clear to one skilled in the art that alternatives including those described above can be used as well.

Figure 10A:
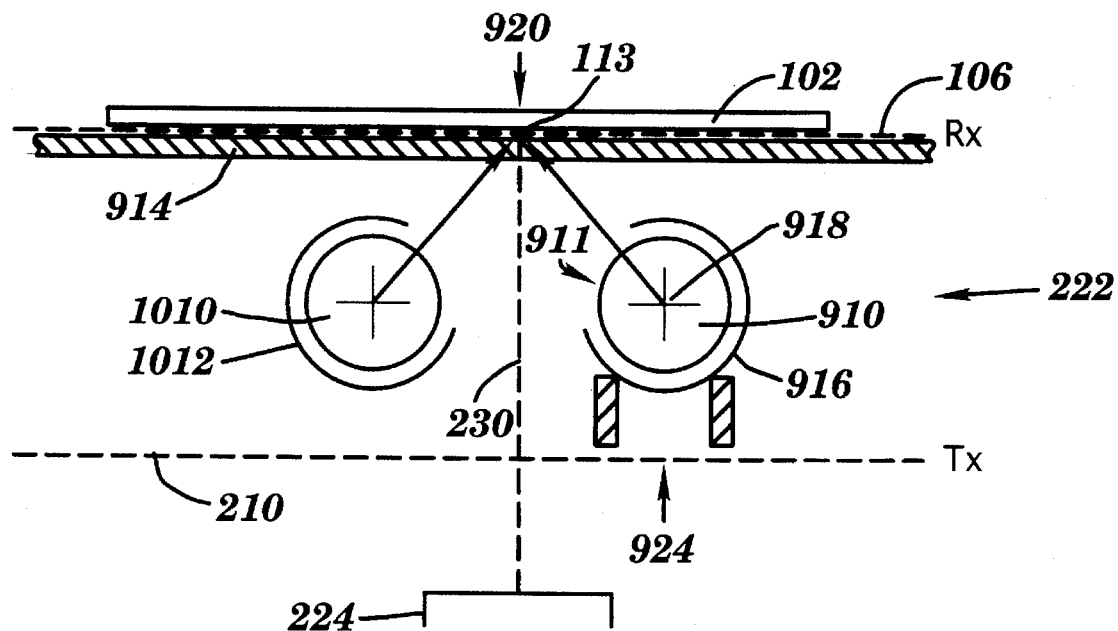
FIG. 10A and FIG. 10B show illumination configurations employing a rotating lamp element.
Figure 10B:
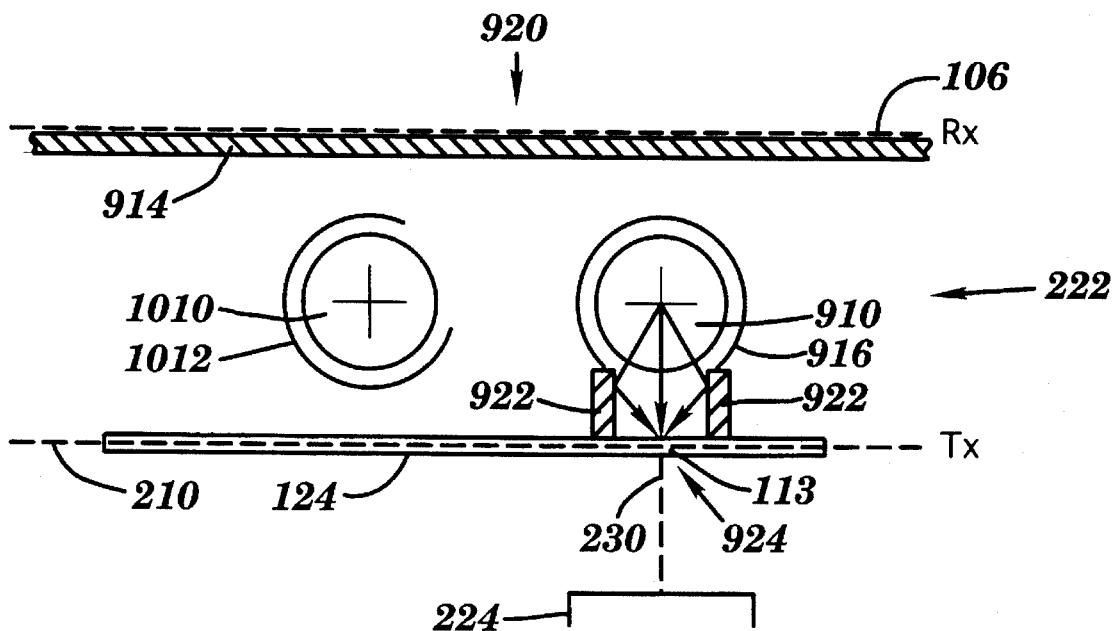

FIG. 10A and FIG. 10B show comparable embodiments using two parallel lamps instead of a single lamp and mirror. Both lamps 910 and 1010 are used for reflective mode scanning as shown in FIG. 10A, whereas only lamp 910 is used for transmissive mode scanning as shown in FIG. 10B. Again, mode change is accomplished by rotation of the reflective collar 916 and relative motion of the illumination system 222. In this configuration, as in those of FIG. 9A and FIG. 9B, a document 102 on reflective scanning surface 914 has no effect upon scanning in transmissive scanning mode.

Figure 11A:
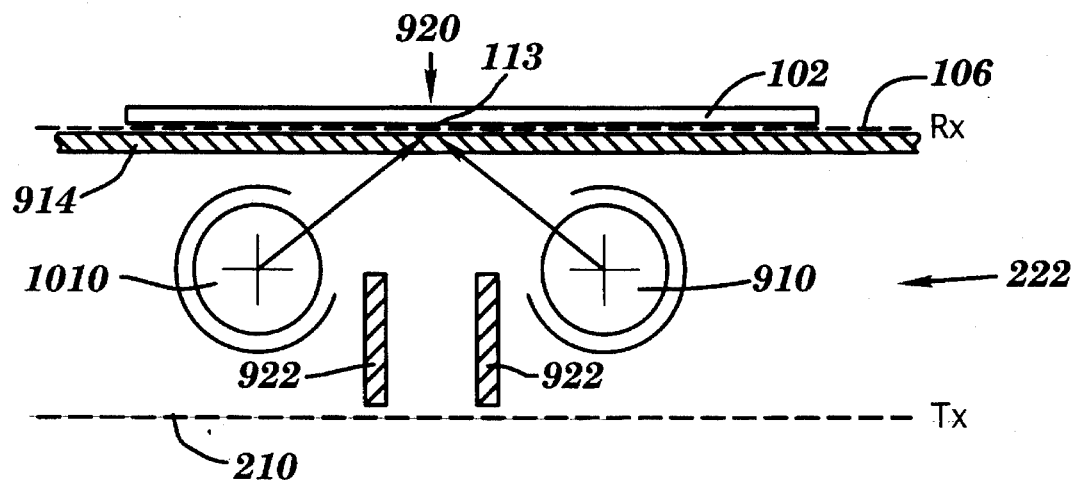
FIG. 11A and FIG. 11B show two-lamp illumination configurations employing diffusers.
Figure 11B:
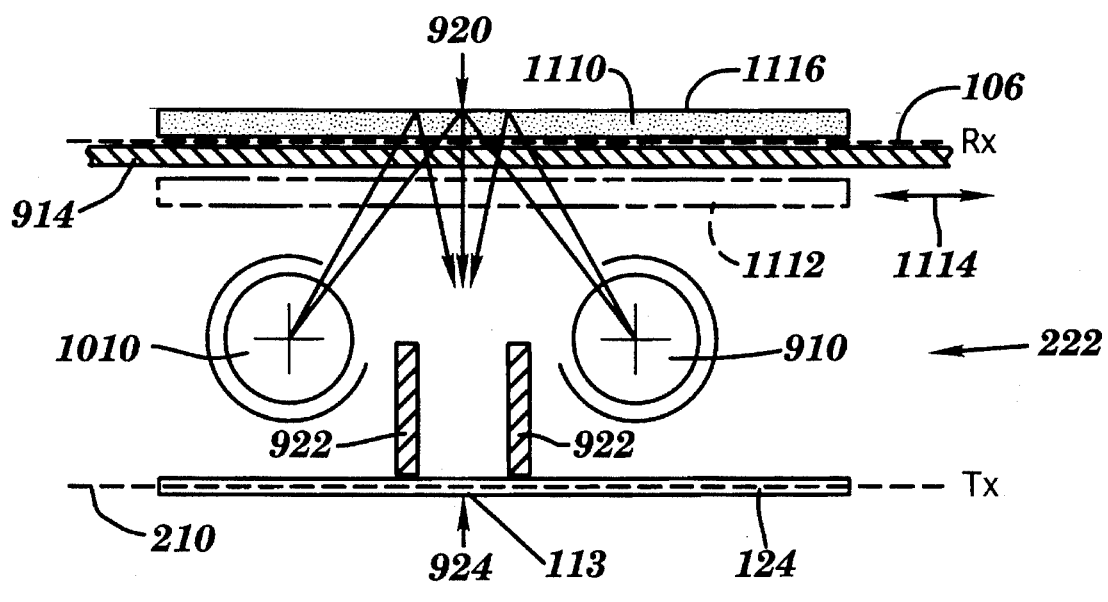

FIG. 11A and FIG. 11B illustrate the use of a substantially flat diffuser to redirect the light of a fixed pair of lamps when in transmissive scanning mode. In FIG. 11A, the lamps 910 and 1010 illuminate scan line 113 at illumination axis 920 in Rx object focal plane 106 as in the previous example. Mode change from reflective scanning mode to transmissive scanning mode is accompanied by use of a diffuser as shown in FIG. 11B. In the simplest case, document 102 is replaced by a high-efficiency diffusing reflector 1110, comprising a sheet of translucent material with a reflective back surface 1116, thereby directing the light down to scam line 113 in Tx plane 210. Although no motion of the illumination system 222 takes place relative to optical system 224 of FIG. 2A, extra work steps are involved in replacing the document 102 with the diffuser sheet 1110. An alternative is the use of a removably disposed diffuser reflector sheet 1112 between the transparent layer 914 and the lamps 910 and 1010. In this case, a mode change is accompanied by insertion or removal 1114 of the diffuser reflector sheet 1112, without the necessity of replacing a document 102 lying on reflective scanning surface 106.

Figure 12A:
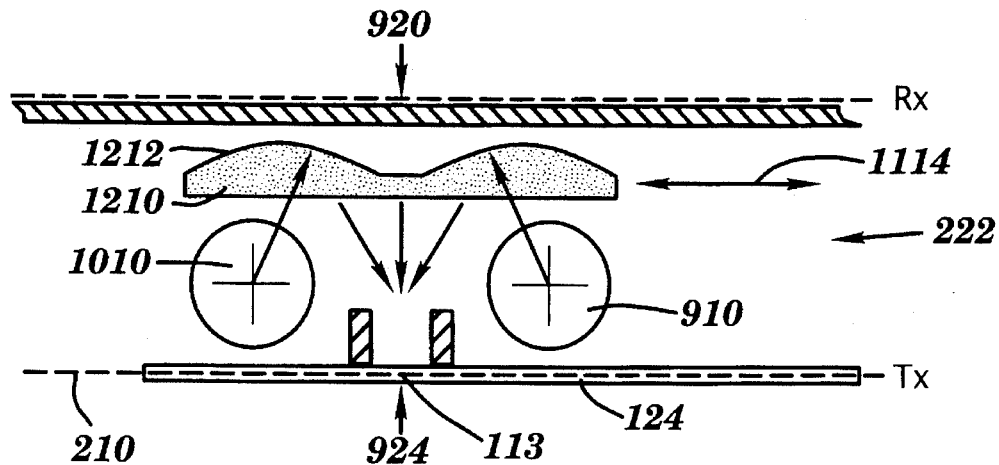
FIG. 12A, FIG. 12B and FIG. 12C show two-lamp illumination configurations employing removably-disposed diffusers, reflectors, or diffuser reflector combinations.
Figure 12B:
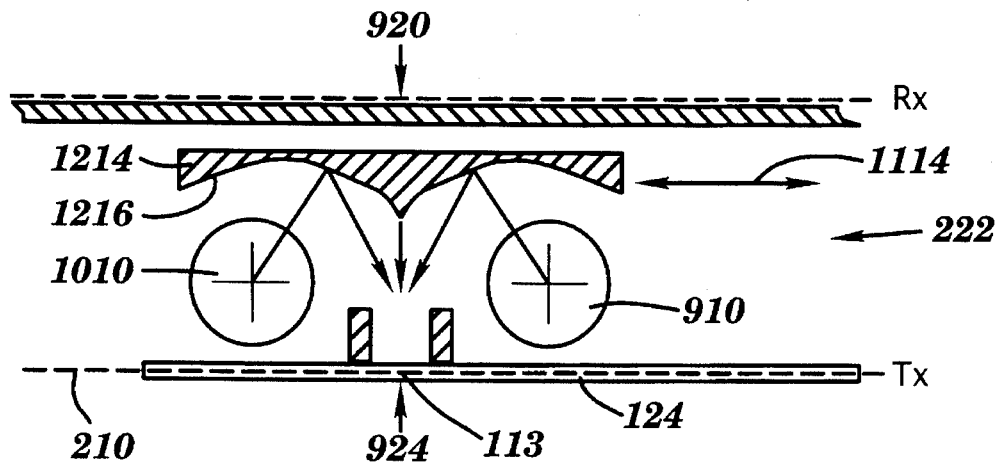
Figure 12C:
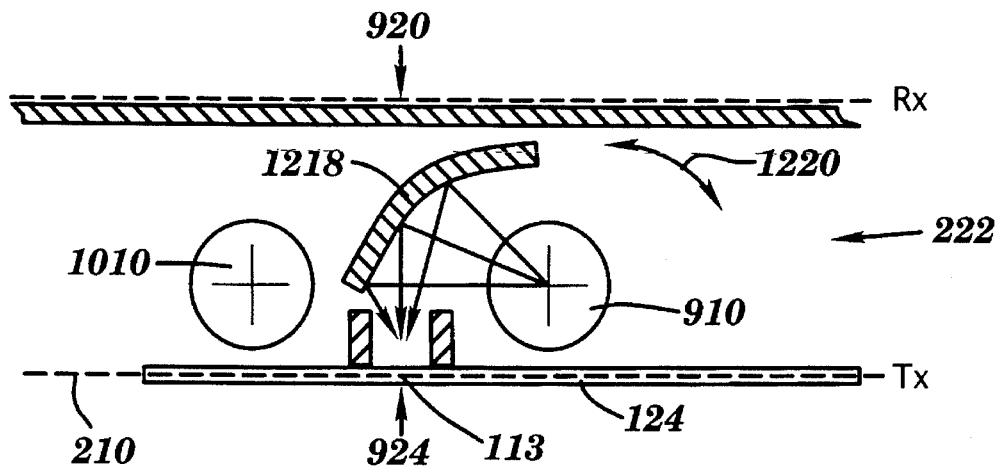

FIG. 12A through FIG. 12C show embodiments which elaborate on those of FIG. 11B, wherein diffusing and/or reflecting elements are inserted or withdrawn between the lamps and the reflective scanning surface to accompany a scanning mode change. In FIG. 12A, a diffuser reflector module 1210 having a back reflecting surface 1212 redirects the light from lamps 910 and 1010 to scan line 113 in Tx object focal plane 210. Motion 1114 of the module 1210 is used to switch modes.

FIG. 12B and FIG. 12C show variations of that described above. In FIG. 12B, a module 1214 is used, having a front reflecting surface 1216, thereby providing specularly-reflected (e.g., focused) instead of purely diffuse illumination as in the previous examples. Again, motion 1114 of the module 1214 is used to switch modes. In FIG. 12C, a single fixed lamp 1010 is used with a rotating mirror 1218 to direct illumination to scan line 113 in Tx object focal plane 210. In this embodiment, a rotation 1220 of mirror 1218 is used to change between transmissive and reflective scanning modes. In each of the embodiments illustrated in FIGS. 12A–12C, a mode change from transmissive to reflective scanning shifts the illumination axis from the transmissive mode illumination axis 924 to the reflective mode illumination axis 920 (and vice-versa).

Figure 13A:
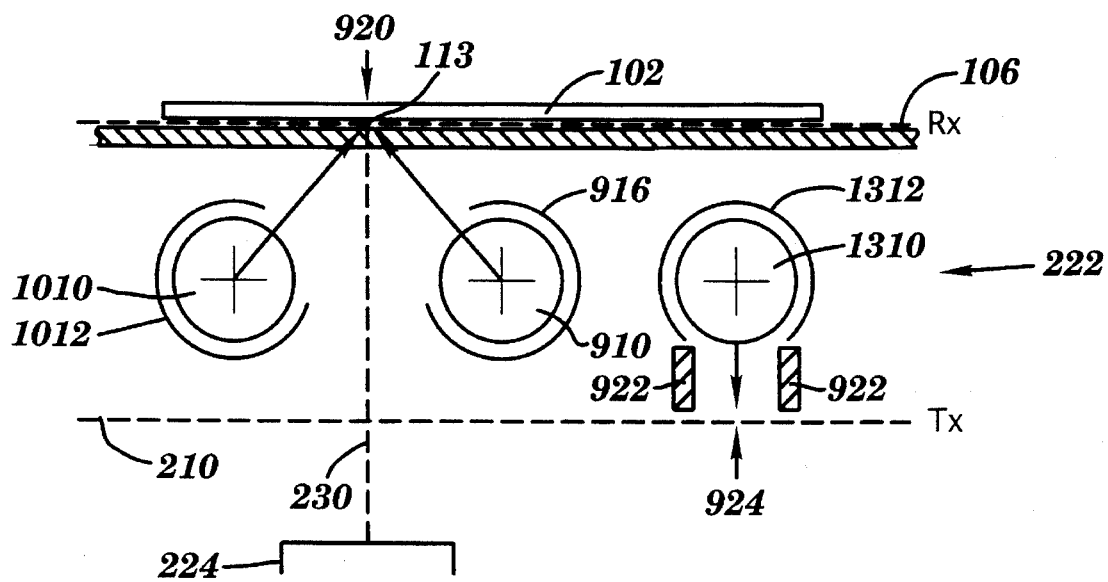
FIG. 13A and FIG. 13B show three-lamp illumination configurations.
Figure 13B:
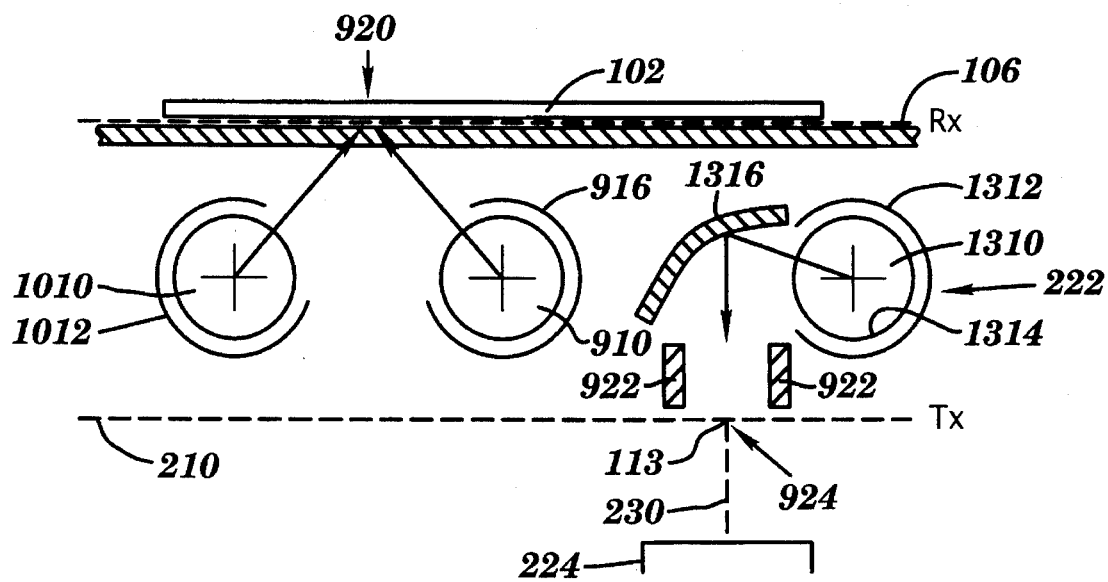

FIG. 13A and FIG. 13B show two configurations of three lamps, with two dedicated to reflective scanning and one to transmissive scanning. These configurations have the advantage that lamps associated with each scanning mode wear uniformly without requiring lamps dedicated to the mode not in use to be lit. In FIG. 13A, lamps 910 and 1010 are used for reflective scanning, and lamp 1310 for transmissive scanning. Since the illumination axes of the lamp systems are not coincident, the illumination system 222 is moved relative to the optical system 224, as in examples of FIG. 9A through FIG. 10B discussed above. In this example, the transmissive mode lamp 1310 is disposed using reflecting collar 1312 to direct diffuse illumination downward, using reflectors 922 for scratch suppression as discussed previously.

In FIG. 13B, an alternative configuration is shown, wherein the transmissive mode lamp 1310 is disposed with reflecting collar 1312 so as to direct illumination other than downward, e.g., substantially horizontally as shown in the drawing, using a reflecting mirror 1316 to redirect the light toward the Tx object focal plane 210. This configuration eliminates localized variations in illumination along the lamp due to settling of particulate matter along its lower inside surface 1314 as the lamp ages. It is to be noted that alternative configurations of mirrors and/or lenses can also be used for the redirection of light.

Figure 14A:
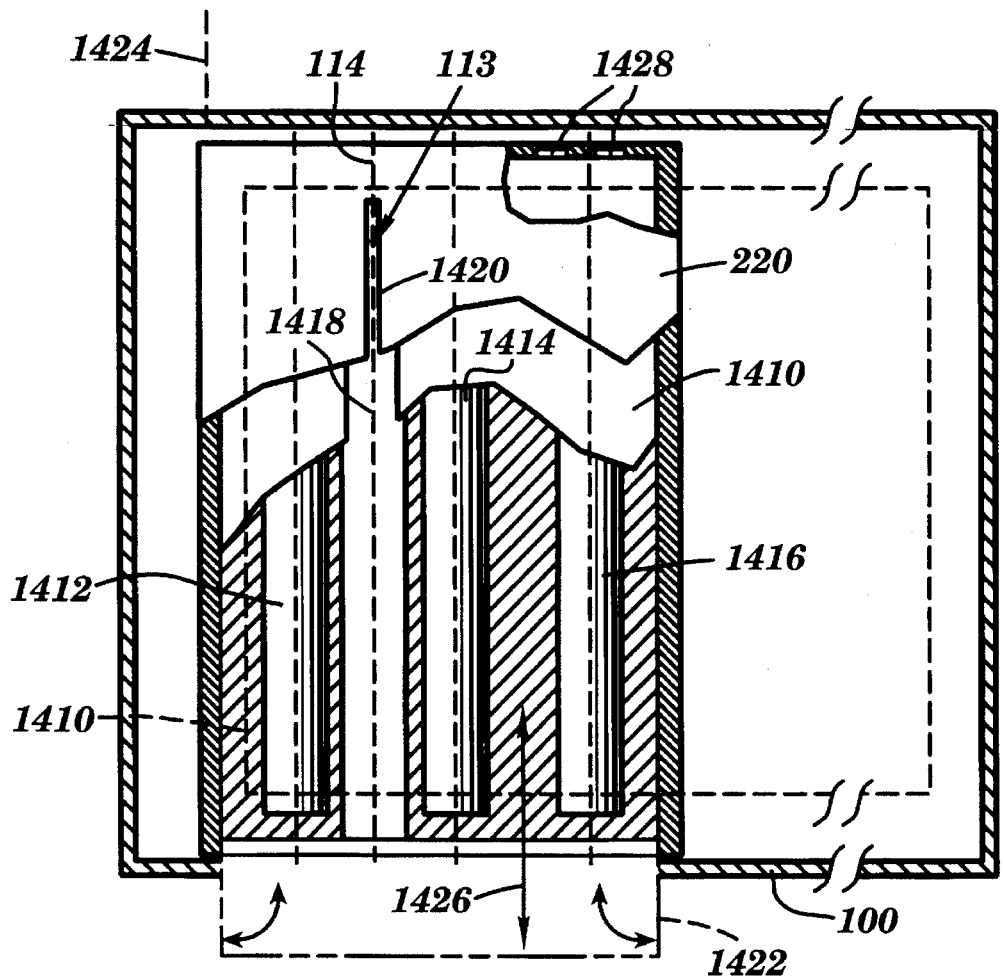
FIG. 14A and FIG. 14B show top and side views of a removable lamp cartridge with three lamps.
Figure 14B:
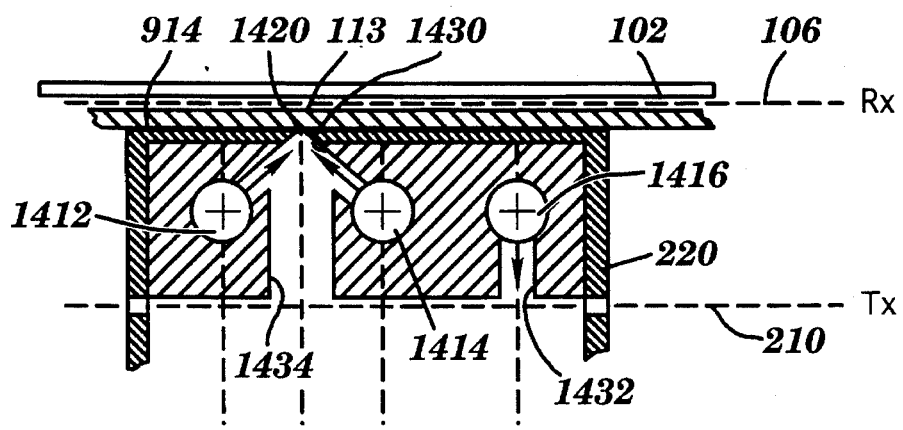

FIG. 14A and FIG. 14B show top and side views of an embodiment of an illumination system comprising three dedicated lamps fixed within a removable lamp module. This configuration has the advantage of ease of replacement, automatic alignment of the illumination components, and uniformity of wear as described above.

The drawings show a scanner 100 with movable scan carriage 220 positioned for module interchange. For the purposes of this discussion, one of the two extreme limits 1424 of carriage travel, hereinafter referred to as the "scan carriage home position", is assumed. Removable module 1410 is disposed within scan carriage 220 for precise positioning of the three lamps 1412, 1414 and 1416. Access to module 1410 is provided by an opening in the scanner case having a flip-down cover 1422, allowing insertion or removal of the module (shown by, arrow 1426). Keyed electrical contacts 1428 assure proper registration of the lamps and power connections for their operation.

Prepositioning of the lamps 1412, 1414, and 1416 in manufacture of the module 1410 assures accuracy of optical alignment and minimum contamination due to handling. Openings and surfaces are designed for maximum capture of light with minimum accompanying flare from unwanted reflected light, using reflective surfaces 1430 and 1432 for direction of light, and absorptive surface 1434 to minimize flare in reflective scanning mode.

The reflective original document 102 is imaged at scan line 113 along scan line axis 114 through transparent lave 914 and through an elongated opening 1420 in the top of scan carriage 220. The opening 1420 is the aperture which defines the object area actually imaged on the sensor corresponding to a given scan line. The elongated opening 1418 in the illumination module 1410 is substantially coincident with but substantially wider than the opening 1420, to assure that critical alignment of the scan line axis 114 is determined by the scan carriage 220 and not by minor variations in the positioning of the removably-disposed illumination module 1410.

Original document Handling

As has been stated previously, an object of the invention is the ability to change easily from reflective to transmissive scanning modes, and vice versa. Accordingly, the embodiments of the invention described herein and illustrated in the following drawings are directed to the use of the one essential pre-scan procedure in any scanning operation: the preparation and handling of original documents, as a means for switching scanning modes.

In these embodiments, an original document to be scanned in reflective scanning is placed face down on a transparent surface, as has been described above. Aids to alignment of reflective media are provided, to be described later in this specification. Transparencies are prepared outside of the scanner using a transmissive media holder, hereinafter referred to as a "Tx slide holder", which assures rectilinear alignment of the original document within the holder, and proper registration of the surface to be scanned when the holder is placed within the scanner unit. Since the Tx slide holder can be supported accurately within the scanner, the use of one or more glass surfaces for support and registration of a transparent original document is unnecessary. As a result, image artifacts due to flare, Newton's rings and surface contamination are eliminated, along with extra time in original document preparation needed to overcome these problems.

Insertion of the Tx slide holder into the scanner can be used to activate the mechanical, optical, and electronic changes accompanying the mode change from reflective scanning mode to transmissive scanning mode, and removal of the Tx slide holder restores those of the reflective mode. Embodiments which carry out these functions involve changes to the illumination system 222 of FIG. 2A, or one or more components of the optical system 224 detailed in the preceding sections.

Figure 15A:
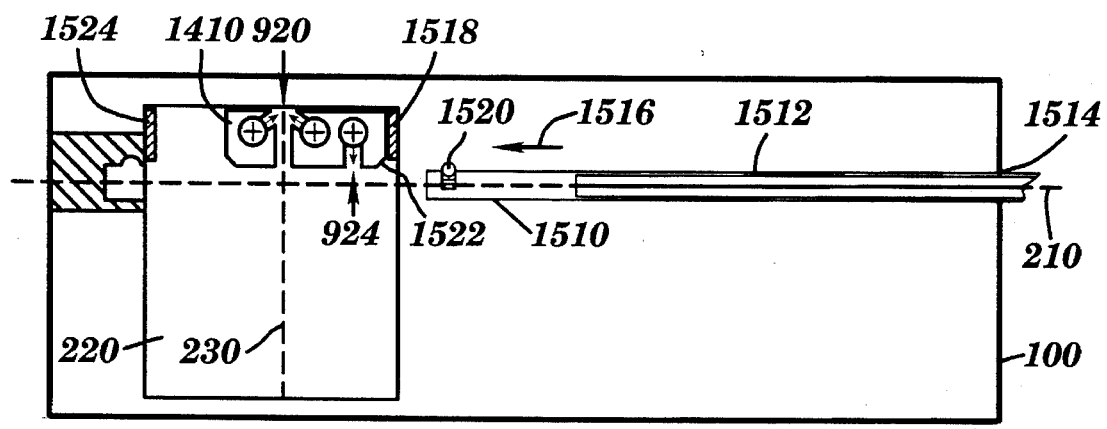
FIG. 15A, FIG. 15B and FIG. 15C illustrate use of a removable transmissive original holder for selection of illumination mode.
Figure 15B:
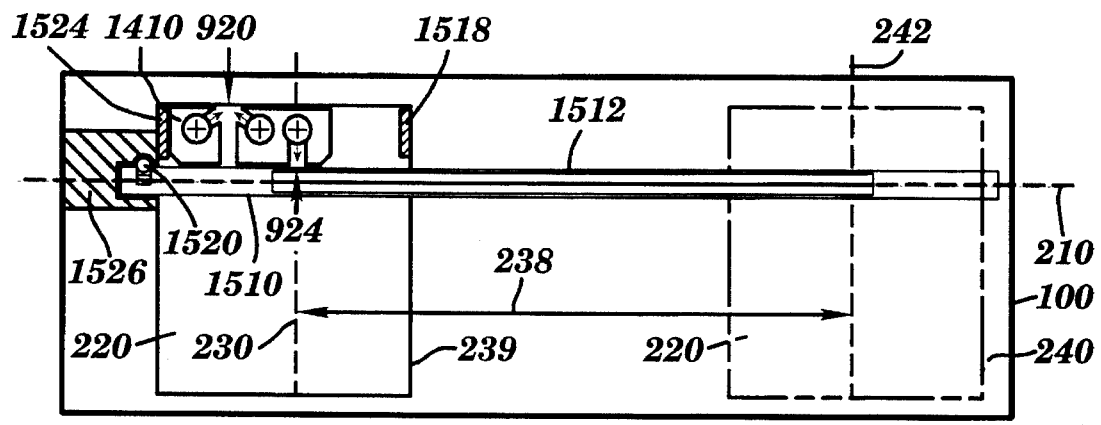
Figure 15C:
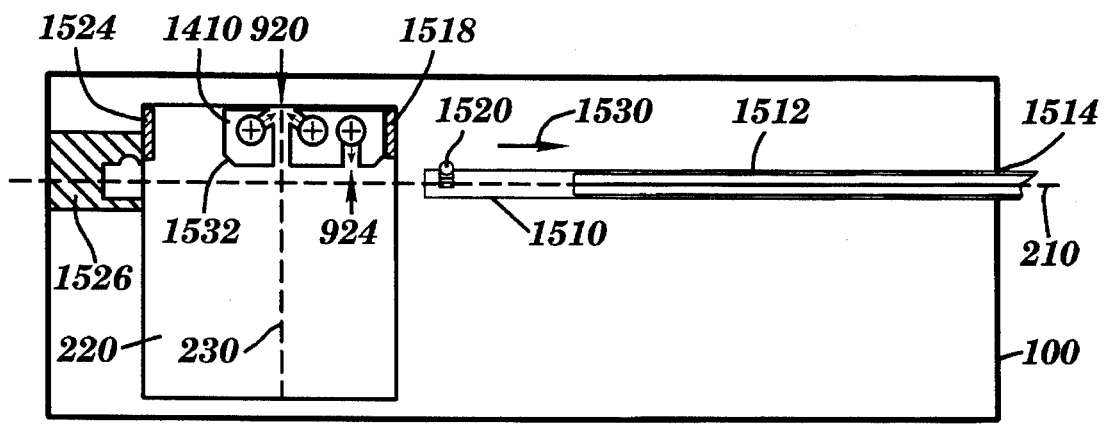

FIG. 15A, FIG. 15B and FIG. 15C illustrate the use of a Tx slide holder to change the illumination mode. In this example, the three-lamp removable cartridge of FIG. 14 is movably disposed within the scan carriage, so as to position either the single transmissive-mode lamp or the pair of reflective-mode lamps in correct alignment with the optical system depending upon whether the Tx slide holder is inserted or not, respectively.

In FIG. 15A, a Tx slide holder 1510 including transparent original document 1512 is inserted through an opening 1514 in the case of scanner 100, and moved by motion 1516 (manually and/or automatically) into position using guides (not shown) substantially parallel to Tx object focal plane 210. Scan carriage 220 having optic axis 230 is shown in an initial position with movably disposed illumination module 1410 in reflective scan illumination mode, i.e., with illumination axis 920 aligned with optic axis 230. In the example, the module 1410 is held in position by a magnet 1518. As the Tx slide holder 1510 is moved, a ball plunger 1520 engages surface 1522 of module 1410, pushing it into the position shown in FIG. 15B, wherein illumination axis 924 is aligned with optic axis 230 and module 1410 is held in position by magnet 1524. At the end of the insertion motion 1516 of Tx slide holder 1510, the ball plunger 1520 engages an indent in end dock 1526, firmly seating Tx slide holder 1510 and holding transparent original document 1512 in proper registration and alignment for scanning.

During a scan operation, scan carriage 220 is moved from initial position 239 to end of scan position 240, thereby moving optic axis 230 to position 242 along path 238, so as to scan original document 1512 from one end to the other. After scanning, the scan carriage 220 is returned to its initial position 239 with no change in relative position of illumination module 1410. In FIG. 15C, Tx slide holder 1510 is removed, reversing the insertion process by motion 1530 of the holder 1510. Again, ball plunger 1520 engages illumination module 1410, this time along surface 1532, thereby moving module 1410 to reflective mode position with illumination axis 920 aligned with optic axis 230, and with module 1410 again held in place by magnet 1518.

Figure 16A:
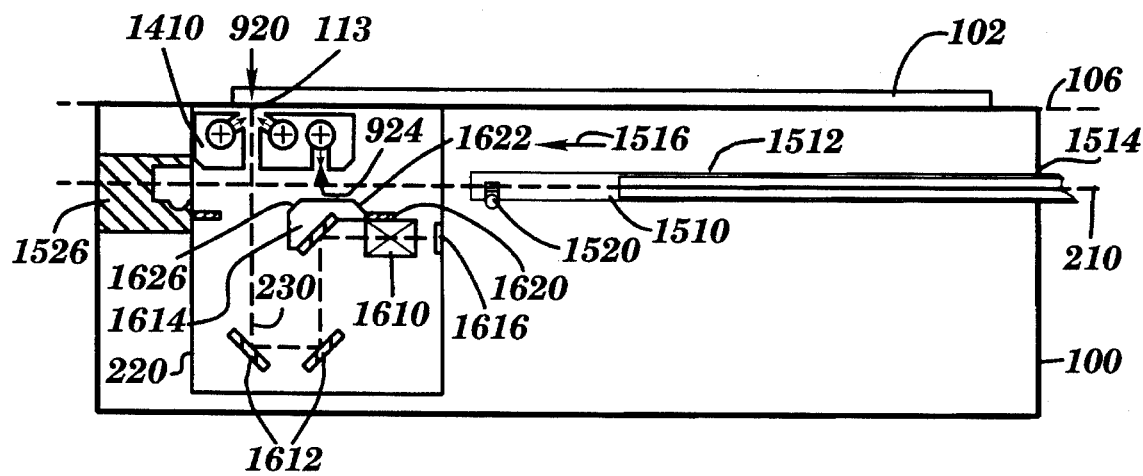
FIG. 16A, FIG. 16B and FIG. 16C illustrate use of a removable transmissive original holder for positioning optical elements for selection of an object focal plane.
Figure 16B:
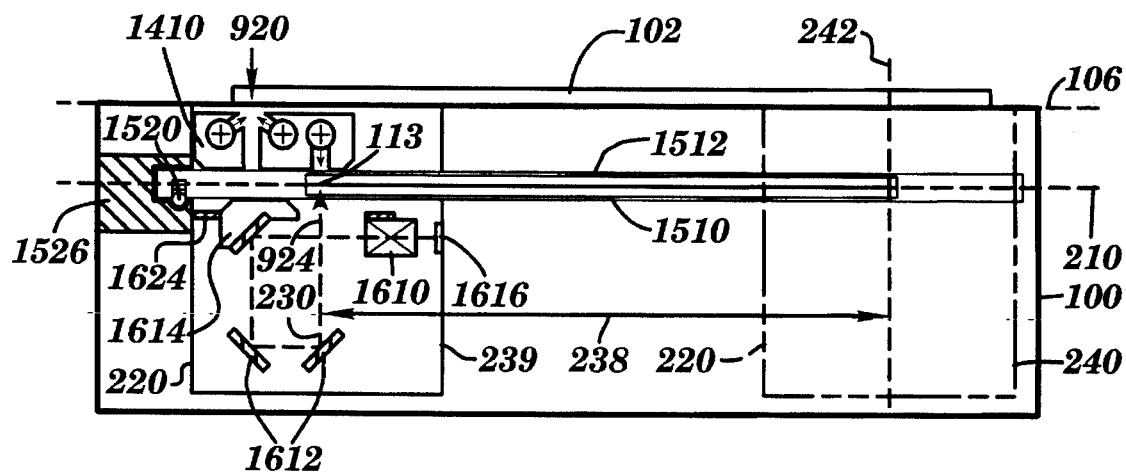
Figure 16C:
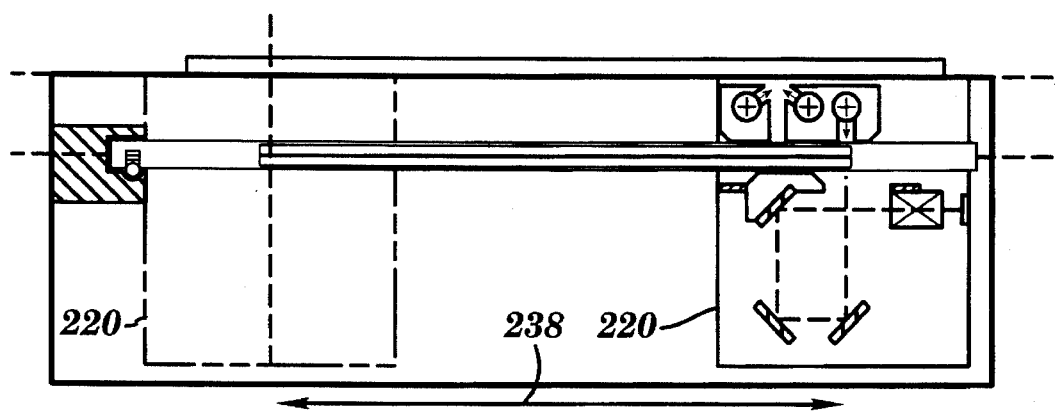

In FIG. 16A, FIG. 16B and FIG. 16C, the illumination system remains fixed, and the insertion of the Tx slide holder causes reconfiguration of the optical system for transmissive scanning mode. FIG. 16A shows a scan carriage 220 with the optical system configured for reflective scanning. Fixed illumination module 1410 provides illumination along illumination axis 920 permitting scanning of original document 102 placed original side down at Rx object focal plane 106. Lens 1610 is used with fixed mirror pair 1612 and movable mirror 1614 to image scan line 113 on sensor array 1616. Movable mirror 1614 is held in position by magnet 1620.

Insertion of Tx slide holder 1510 through opening 1514 in the case of scanner 100 moves holder 1510 with transparent original document 1512 into position by motion 1516 as in the previous example. Ball plunger 1520 engages surface 1622 of movable mirror 1614 moving it into position for transmissive mode scanning as shown in FIG. 16B, wherein it is held in position by magnet 1624. As in the previous example, the Tx slide holder 1510 is firmly seated in end dock 1526 using ball plunger 1520. In this configuration, a scan line 113 of transparent original document 1512 is illuminated along transmissive illumination axis 924, and imaged by lens 1610 on sensor array 1616. Scanning of the original document 1512 is completed as scan carriage 220 is moved from initial position 239 to end of scan position 240, moving optic axis 230 to position 242 by motion 238. The end of scan position is shown in FIG. 16C.

As in the previous example, removal of the Tx slide holder 1510 reverses the sequence of FIG. 16A, with ball plunger 1520 engaging surface 1626 of movable mirror 1616 and restoring it to the correct position for reflective scanning.

The examples shown above illustrate specific examples of mode-change operations actuated by insertion or removal of a Tx slide holder. It will be apparent to one skilled in the art that many variations exist for reconfiguration of illumination and optical components, singly or in combination.

Sealed Scan Carriage

The ability to protect the optical system of a scanner by enclosing it physically and optically, has a major effect upon data quality and maintenance requirements. As has been discussed previously, dust settling upon optical surfaces such as mirrors, lenses or CCD array elements can provide contamination of the digitized signal as well as loss of sensitivity. Typical artifacts in the data include streaking along the scanning axis. Embodiments which minimize these effects have been described, for example in FIG. 5A and FIG. 5B wherein upward-facing mirror elements are kept at sufficient distance from an object focal plane to avoid imaging dust particles. Other provisions, such as vertically disposed lens and CCD surfaces as shown in FIG. 8, are helpful in minimizing dust settling effects, but cannot entirely eliminate them as long as air movement exists within the scan carriage.

A second problem occurs as a result of light which is scattered from optical and other surfaces within the scan carriage, raising the background noise level in the captured data and introducing unwanted artifacts in the digitized image. This "flare" arises from ambient light which enters the scan carriage as well as from light coming from the illumination system by other than the path of a correctly imaged object point. Flare is minimized but not eliminated in the embodiments of the optical system described previously, by reducing the number of medium transitions within the optical path, e.g., glass windows within which multiple reflections can occur, use of optical anti-reflection coating for lenses and CCD window glass, etc.

A third problem occurs during dark current calibration of the CCD sensor system, as a result of stray light entering the system from ambient sources. Since the major source of such light is from the scanner illumination system, this problem can be minimized by shutting the lamps off during the calibration procedure. Cycling the lamps off and on again causes stress on the lamps, thereby shortening their lifetime, and requires a stabilization period before resumption of scanning operations in order to avoid image quality degradation. The combined effect of this and the previously described problems is reduction in overall productivity of the scanning system.

The above problems are addressed in the invention by enclosing the optical system components of the movable scan carriage in a light-sealed enclosure, protected by a "dark slide" movably disposed relative to the scan carriage such that there are no physical or optical openings in the enclosure except during an actual scan. Accordingly, there is minimal movement of air and reduced exposure of surfaces to dust during shipping, idle times, when originals are inserted into the scanner, and when the unit is opened for service. The dark slide also eliminates noise in the CCD signal due to ambient stray light, without the necessity of cycling the lamps off and on during dark current calibration.

Figure 17A:
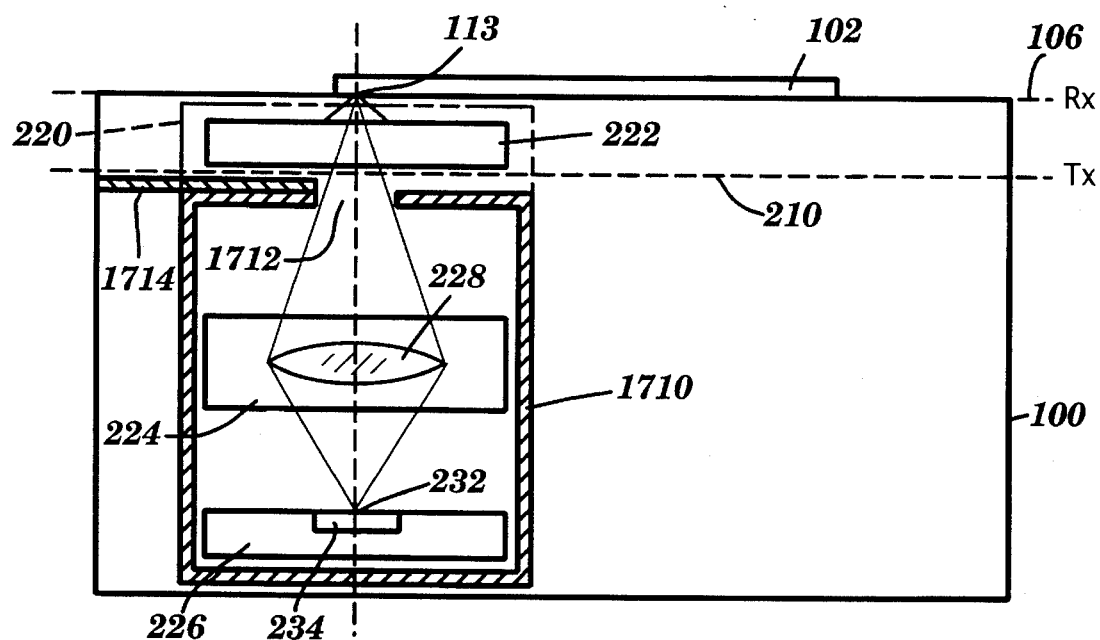
FIG. 17A and FIG. 17B illustrate the use of a dark slide for dust protection and dark current calibration.
Figure 17B:
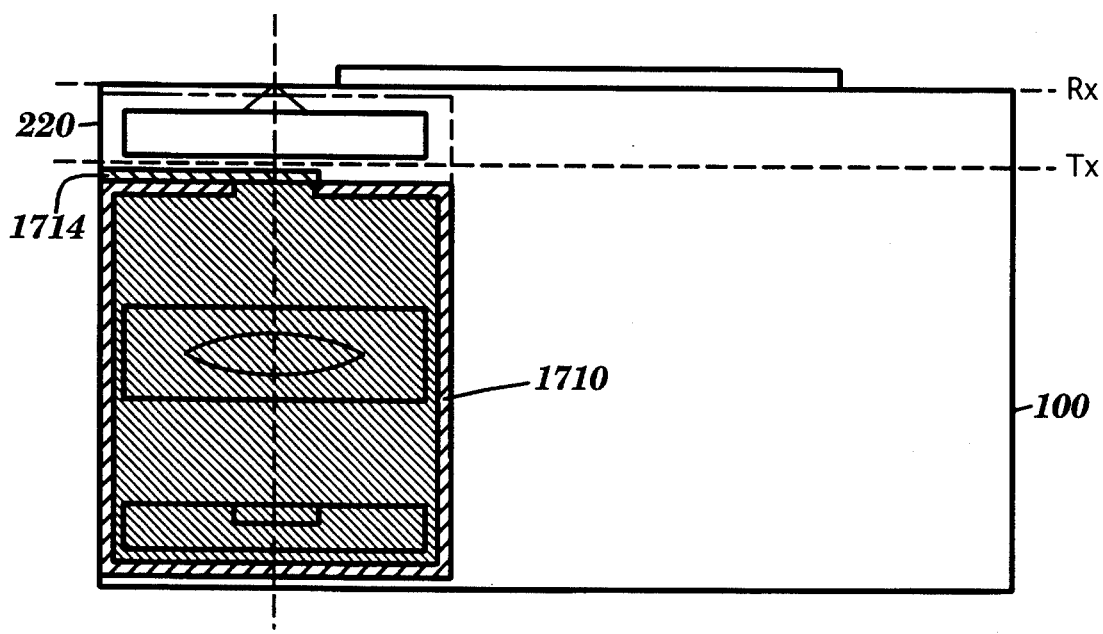

FIG. 17A and FIG. 17B illustrate the use of a stationary dark slide which seals the optical enclosure when the scan carriage is idle or in dark current calibration mode. In FIG. 17A, the movable scan carriage 220 of FIG. 2A is shown in reflective scanning mode, with illumination system 222 illuminating scan line 113 of a reflective original document 106, imaged by optical system 224 containing lens 228 on sensor system 226 containing sensor array 234. The scan carriage 220 is physically and optically sealed by enclosure 1710 except at an aperture 1712 of width sufficient to capture fully the illuminated scan line 113. A stationary dark slide 1714 is fixed to the case of scanner 100 so as to be clear of the opening 1712 during scanning. In FIG. 17B, the scan carriage 220 has been moved to the home position for dust protection or dark current calibration. In this position, the stationary dark slide 1714 completely covers opening 1712 in sealed enclosure 1710, thereby excluding dust and light.

Figure 18A:
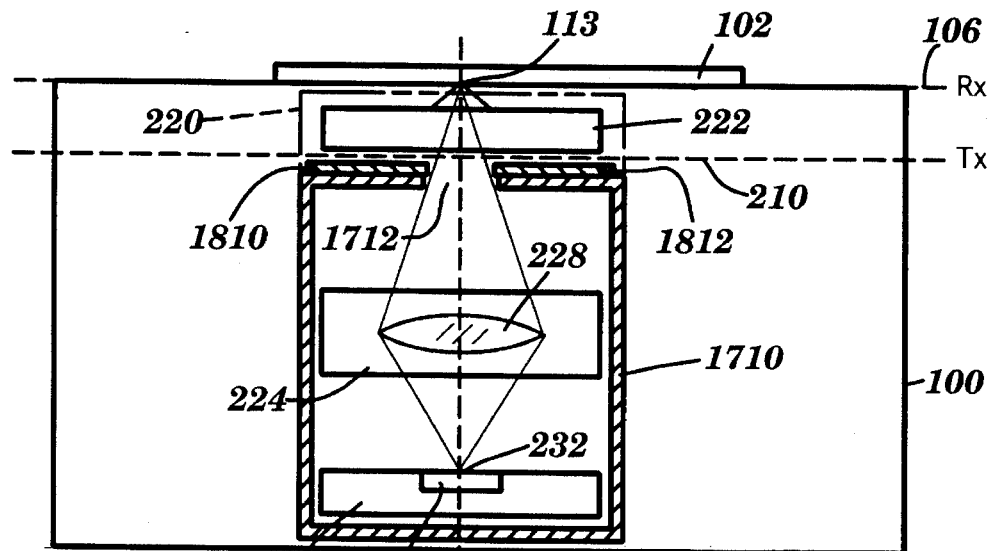
FIG. 18A, FIG. 18B and FIG. 18C illustrate the use of an aperture shutter/dark slide combination for dust protection, dark current calibration, and reduction of the effects of flare within the moving carriage.
Figure 18B:
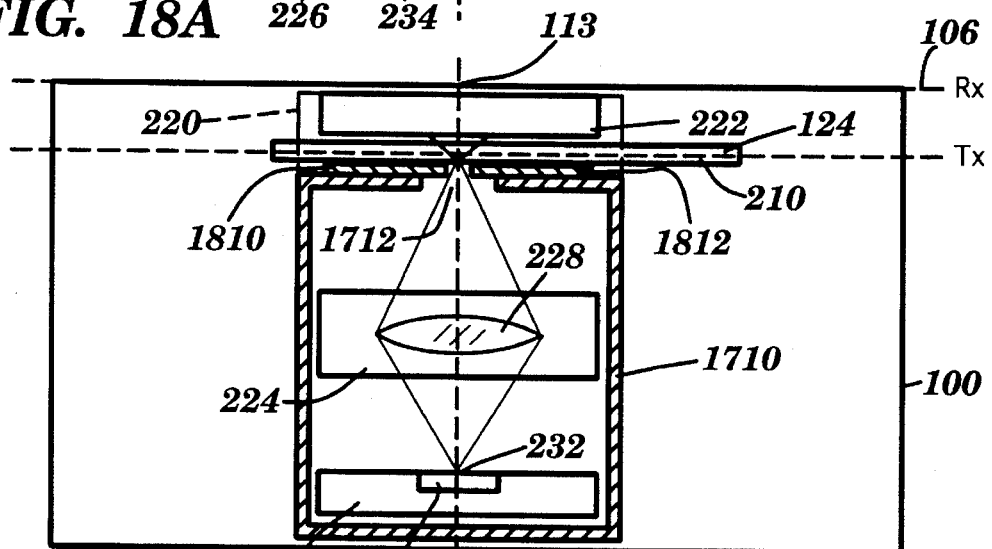
Figure 18C:
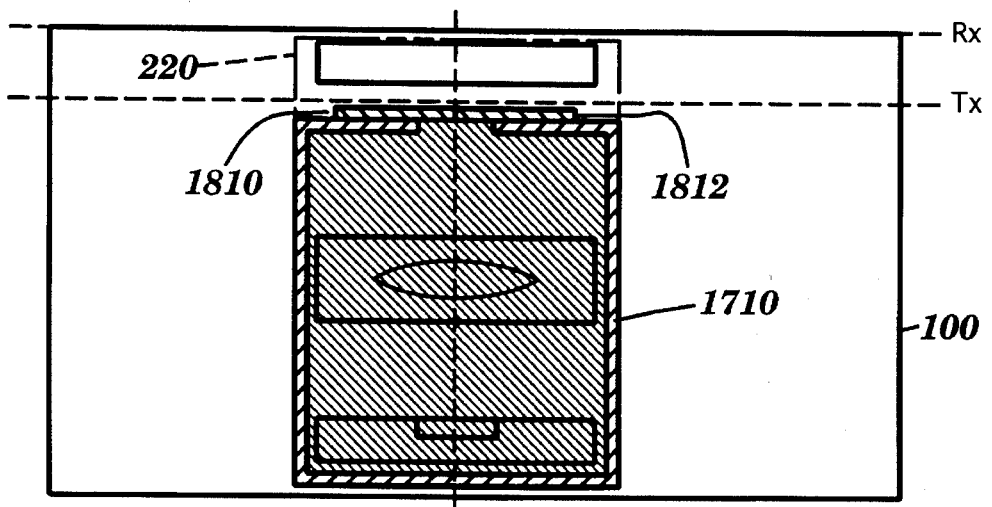

An alternative to the stationary dark slide of FIG. 17A and FIG. 17B is an aperture shutter comprised of a plurality of dark slides movably fixed to and moving with the scan carriage, as shown in FIG. 18A, FIG. 18B and FIG. 18C. This embodiment provides not only for sealing the enclosure completely when idle or in dark current calibration mode, but also for changes in aperture width and/or length according to scanning mode, thereby minimizing flare effects during scanning.

In FIG. 18A, the system is being used in reflective scanning mode. Scan carriage 220 is fitted with a sealed enclosure 1710 having fixed aperture 1712 as in the previous example. The scan carriage 220 is additionally fitted with a pair of movably disposed slides 1810 and 1812, forming a shutter which can be operated by a motor and/or other linkages as appropriate. In reflective scanning mode, the shutter is opened to the maximum extent, providing an opening substantially equal to the aperture 1712 of the enclosure 1710.

FIG. 18B shows the same system configured for transmissive scanning mode. In this case, the movably disposed slides 1810 and 1812 are moved closer together, providing an opening substantially equal to that defining a scan line 113 at the Tx object focal plane 210. Since the shutter aperture is reduced to the minimum size used for transmissive scanning mode, flare is minimized, along with dust entry.

In the idle/dark current calibration mode, shown in FIG. 18C, the pair of slides 1810 and 1812 are moved together, thereby closing the shutter completely and sealing the enclosure 1710 against light and dust. Of course, it should be noted that the slides 1810 and 1812 and/or other slide configurations may also be utilized to adjustably define the width of the scan line without departing from the scope of the present invention.

Drive System

An important factor in the quality of a digitized representation of an original scanned by a scanner system is the uniformity, and precision of the linear drive system used for the relative motion of the scan line of the scanned original along the original document in the direction of the scanning axis. Small variations in the motion result in wobbling or tilting of the scan line axis, showing up as bands and streaks in the digitized data. In the apparatus of the invention, the illumination system, optical system, and sensor system are moved together as a unit within the movable scan carriage. Accordingly, wobbles around an axis substantially perpendicular to the scanning axis effectively "twist" the scan line axis with respect to a scanned original, while tilting around an axis substantially parallel to either the scan line axis or scanning axis can cause variations in illumination from one scan line to the next, which appear as bands in the digitized image.

In addition to uniformity of the linear drive system, it is necessary to index the position of the scan line with precision, using a position encoding system accurate to a resolution element or better. Embodiments of the invention addressing these requirements are discussed in the following discussion and accompanying drawings.

Figure 19A:
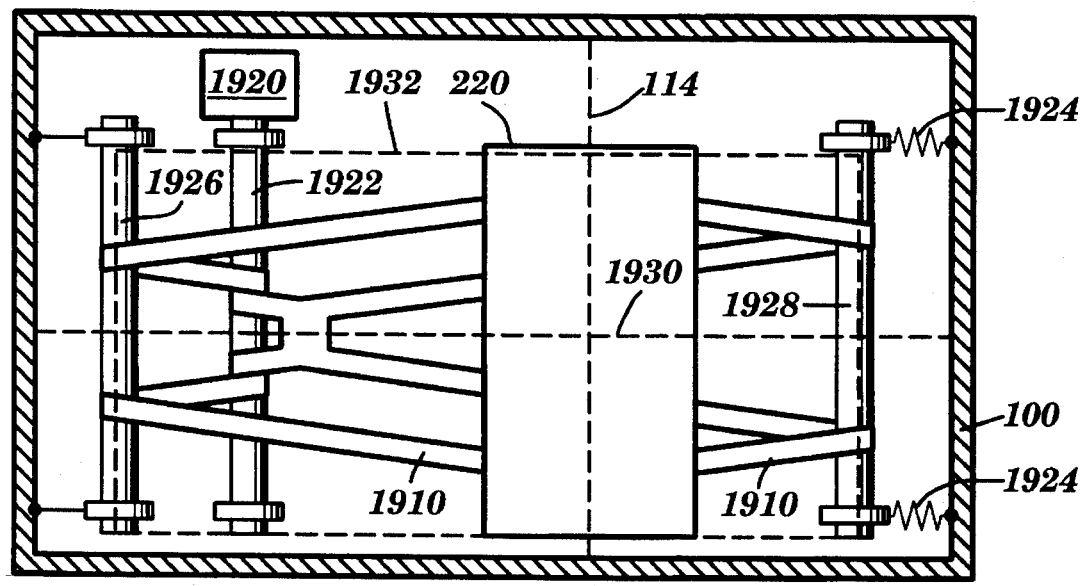
FIG. 19A and FIG. 19B show top and side views of a linear drive system for a scanner carriage, using helically-wound bands.
Figure 19B:
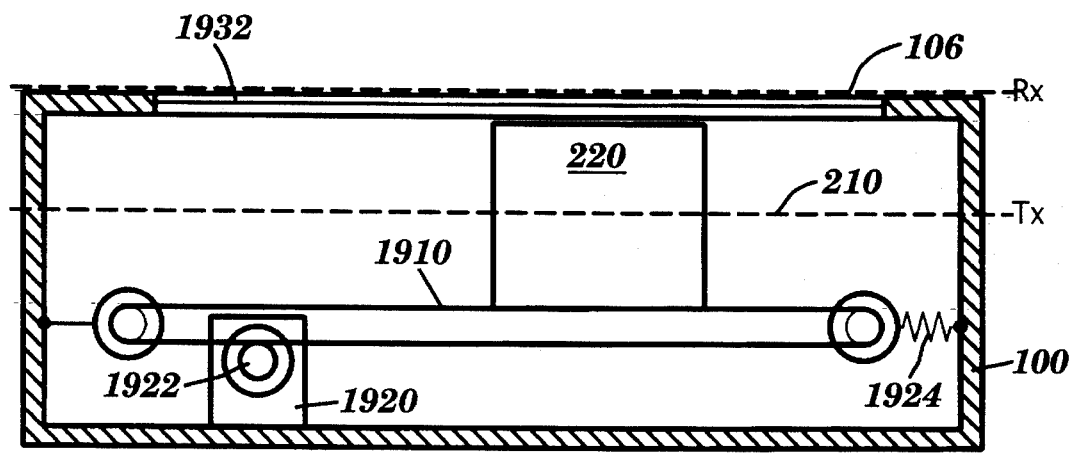

FIG. 19A and FIG. 19B show top and side views of a linear drive system offering uniformity and positioning precision, wherein the scan carriage is carried by a flexible drive member comprised of helically-wound bands disposed end-to-end, and frictionally coupled to a drive motor. In this configuration, scan carriage 220 is driven by motion of band 1910 under control of drive motor 1920. The band 1910 is helically wound around drive shaft 1922 and held in tension by springs 1924. Shafts 1926 and 1928 are used as direction-changing rollers. Rotary motion of shaft 1922 is converted into linear motion of the band 1910, and motion of scan carriage 220 along scanning axis 1930, within limits determined by the positions of shafts 1926 and 1928. This linear motion provides for complete scanning of an original document along scanning axis 1930 within the limits of window 1932.

Figure 20A:
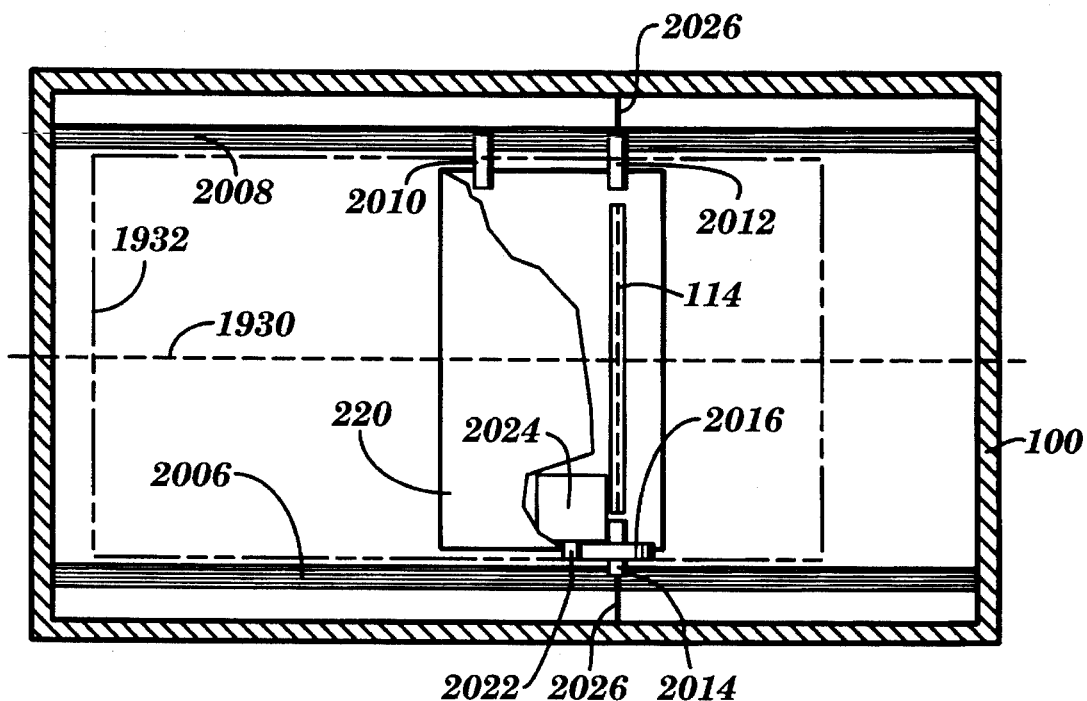
FIG. 20A and FIG. 20B show top and side views of a drive system wherein the scan line axis of an scanned original passes through a center of rotation of the scanning module.
Figure 20B:
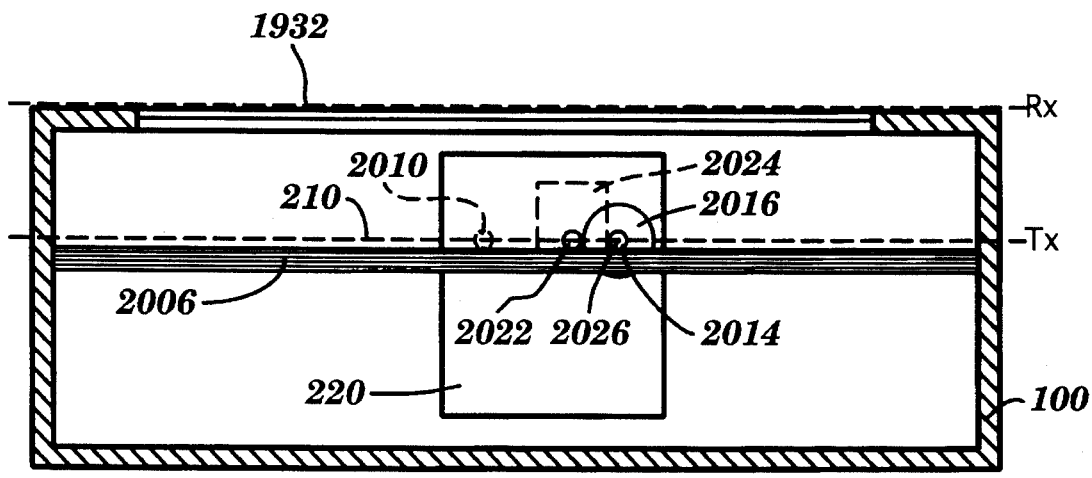

An alternate linear drive system embodiment is shown in FIG. 20A and FIG. 20B, wherein the scan carriage is supported along one or more axes substantially coincident with the Tx object focal plane 210. This configuration provides an effective center of rotation designed to coincide with the scan line in the object focal plane most sensitive to tilting effects described above. In the drawings, scan carriage 220 is supported at three points along rails 2006 and 2008, using passive rotating shafts 2010, 2012 and a driven shaft 2014. A friction wheel 2016, attached to driven shaft 2014, is driven by the drive shaft 2022 of a motor 2024. As a result of this configuration, the center of rotation due to variations in the drive speed of motor 2024 is along a rotation axis 2026 which is substantially parallel to scan line axis 114 and substantially coincident with the Tx object focal plane 210. The scan carriage 220 can be driven between limits determined by the physical dimensions of the scan carriage 220 and the enclosure of the scanner 100 to scan an original document along scanning axis 1930 within the limits of window 1932.

A variety of motor and encoding configurations can be used in the drive system of the invention, including stepper motors and torque motors with shaft or linear-position encoders. A stepper motor provides precision in position indexing without complexity, while using a greater amount of time for "slew" motions of the scan carriage, i.e., when returning the carriage to home position at the end of a scan. A torque motor, on the other hand, provides for a wide range of driving rates, but requires an encoder and feedback system to ensure positional accuracy. A shaft encoder coupled to the drive motor, or a linear encoder contained on the scan carriage itself can be used for this function.

Figure 21A:
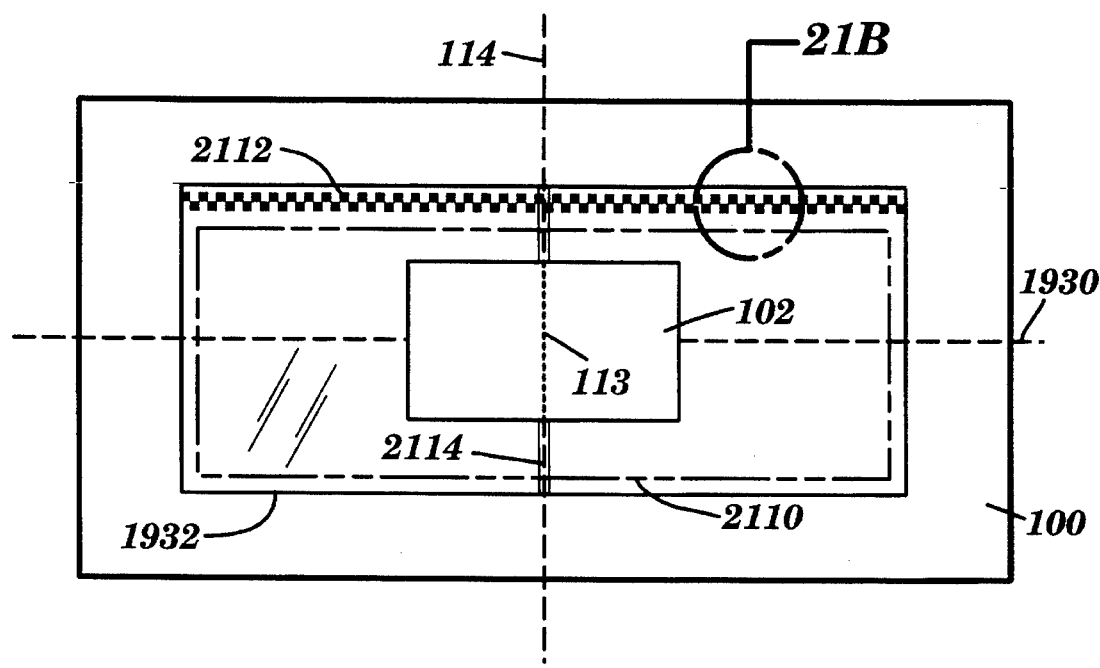
FIG. 21 illustrates an embodiment wherein position encoding utilizes elements of a CCD array; and, FIG. 22A and FIG. 22B show top and side views of an alignment grid system for reflective originals according to the invention.
Figure 21B:
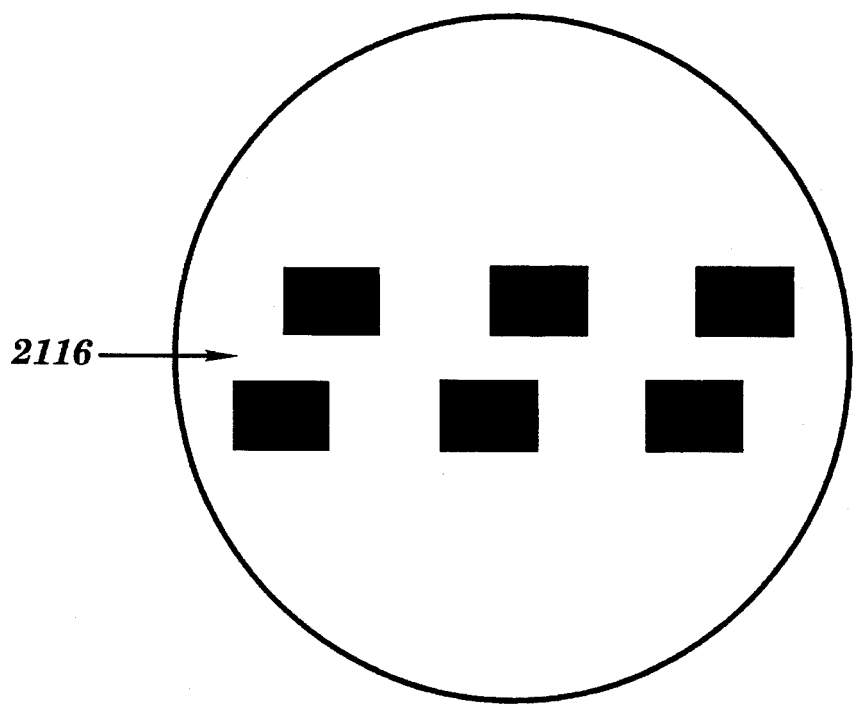

An implementation of a linear position encoder using a linear CCD array (i.e., the linear sensor array 234 shown in FIG. 2A and FIG. 2B) is illustrated in FIG. 21. In this configuration, a number of elements of the linear CCD array outside an active imaging area of the scan line 113 are dedicated to position encoding. Transparent surface 1932 is comprised of active imaging area 2110 and linear encoder 2112 such that the scanning area 2114 imaged on the linear CCD array includes an image of a scan line 113 of an original document 102 and an image of the linear encoder 2112 along scan line axis 114. As shown in exploded view in FIG. 21, the linear encoder 2112 can for example be a linear 50% duty-cycle black/white pattern in 90° quadrature 2116, having a spatial frequency enabling exact position readout to within a resolution element of the digitized representation of a scanned original. The image of the linear encoder 2112, once captured by the designated elements of the linear CCD array, can be suitably decoded according to known decoding methods to provide accurate positional information during scanning.

Automatic Reflective Media Positioning

One of the more time-consuming activities in production scanning is positioning of media to be scanned for correct registration and alignment. Even small alignment errors can cause angular displacement with respect to the orthogonal coordinate system defined by the scan line axis and scanning axis. These errors must be corrected by multiple scanning iterations, or later in data processing software. In either case, greater user interaction and loss of overall productivity are the result. The problem is more acute for reflective original documents than for transparencies since the former are opaque, placed original side down on the transparent surface at the Rx object focal plane, and scanned at a lower resolution (and therefore more likely to introduce visible "steps" in straight lines in the digitized image resulting from slight angular displacement). Transparencies, on the other hand, are held in place by features of the Tx slide holder, which can be configured for a particular slide size and fitted with registration aids. Finally, since transparencies can be prepared outside the scanner at a setup workstation, the scanner does not have to be idle while setup takes place, as is the case for preparing reflective media.

Figure 22A:
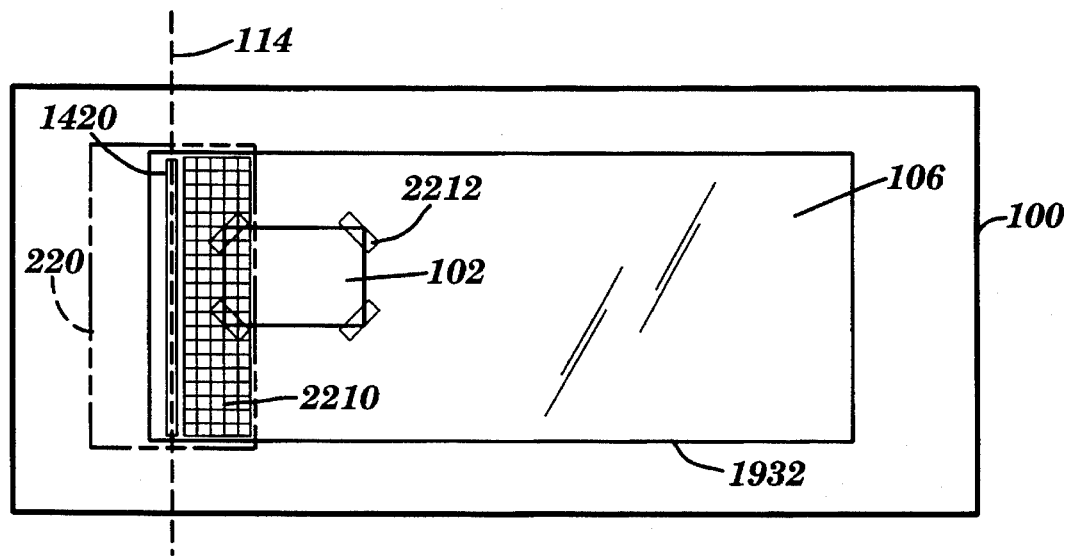
Figure 22B:
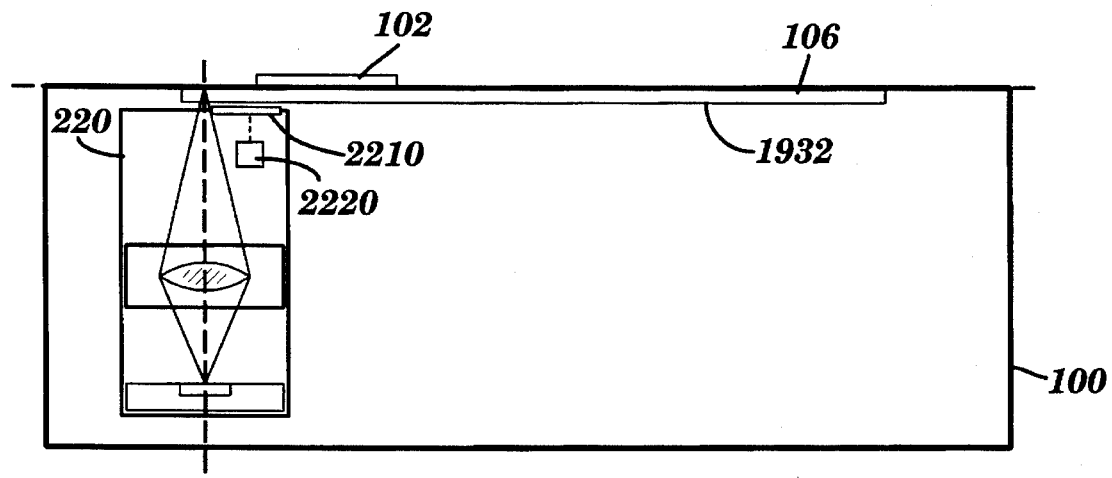

FIG. 22A and FIG. 22B show top and side views of an alignment tool built into the scanner according to an embodiment of the invention, directly referencing the scan line axis and scanning axis, and visible to the user during the preparation of reflective media for scanning. Since the alignment grid is in permanent registration with the optical coordinate system, visual alignment to the grid can be quickly carried out with a higher degree of accuracy.

In the example shown, an original document 102 to be scanned in reflective scanning mode is placed original side down on transparent surface 106 within active scanning area 1932. An alignment grid 2210 is provided on the top surface of the scan carriage 220 in accurate registration with scan line axis 114. The original document 102 is aligned to the alignment grid 2210 and fixed in place, using for example, removable tape 2212. Since the scan carriage 220 can be moved to any location within the active scanning area 1932, the alignment grid 2210 is available everywhere for the alignment of the original. In an alternate embodiment, the grid pattern 2210 is illuminated from below using an illumination source 2220 such that the grid pattern 2210 is visible through the substrate of original document 102. In this case, even with photographic prints, the original to be scanned can itself be aligned to the grid pattern 2210 rather than only the edges of the original document 102.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

What we claim is:

1. A system for scanning an original document to obtain a digitized representation of said original document, said scanning system comprising:

(A) An object focal plane;

(B) Scanning means, movably disposed for linear motion along a scanning axis, for illuminating a scan line of an original document located in said object focal plane, and for obtaining a digitized representation of said scan line;

(C) Means for displacing said scanning means along said scanning axis to obtain digitized representations of successive scan lines of said original document, said digitized representations of said successive scan lines together comprising said digital representation of said original document; wherein said scanning means further comprises a lens assembly and means for rotatably positioning said lens assembly about an axis of rotation substantially perpendicular to an optic axis of said lens assembly, a rotation of said lens assembly displacing said lens assembly linearly along a path substantially parallel to said optic axis.

2. The apparatus of claim 1 wherein said lens assembly includes at least one lens.

3. The apparatus of claim 1 wherein said scanning means includes means for determining a scanning resolution of said digital representation of said original document.

4. The apparatus of claim 3 wherein said resolution determining means further includes means for rotating said lens assembly about said axis of rotation to determine said scanning resolution.

5. The apparatus of claim 4 wherein said rotation occurs in angular increments substantially equal to 180°.

6. The apparatus of claim 3 wherein said resolution determining means further includes means for displacing said axis of rotation along a direction substantially parallel to said optic axis.

* * * * *